(12) United States Patent
Christie et al.

(10) Patent No.: US 6,230,259 B1
(45) Date of Patent: *May 8, 2001

(54) TRANSPARENT EXTENDED STATE SAVE

(75) Inventors: David S. Christie, Austin, TX (US); Uwe Kranich, Munich (DE)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,681

(22) Filed: Oct. 31, 1997

(51) Int. Cl.⁷ .................................................. G06F 15/00
(52) U.S. Cl. ............................................ 712/228; 712/229
(58) Field of Search .................................. 395/569, 570, 395/800.43, 800.42, 500, 653, 734; 712/210, 228, 229

(56) References Cited

U.S. PATENT DOCUMENTS

| | | |
|---|---|---|
| 4,044,338 | 8/1977 | Wolf . |
| 4,050,094 | 9/1977 | Bourke . |
| 4,109,311 | 8/1978 | Blum et al. . |
| 4,385,352 | 5/1983 | Bienvenu . |
| 4,453,212 | 6/1984 | Gaither et al. . |
| 4,807,115 | 2/1989 | Torng . |
| 4,835,734 | 5/1989 | Kodaira . |
| 4,858,105 | 8/1989 | Kuriyama et al. . |
| 4,926,322 | 5/1990 | Stimac . |

(List continued on next page.)

FOREIGN PATENT DOCUMENTS

| | | |
|---|---|---|
| 0 67667 | 12/1982 | (EP) . |
| 0259095 | 3/1988 | (EP) . |
| 0 369396 | 5/1990 | (EP) . |
| 0381471 | 8/1990 | (EP) . |
| 0 425410 | 5/1991 | (EP) . |
| 0459232 | 12/1991 | (EP) . |
| 0 467152 | 1/1992 | (EP) . |
| 2263985 | 8/1993 | (GB) . |
| 2263987 | 8/1993 | (GB) . |
| 2281422 | 3/1995 | (GB) . |
| WO 96/24895 | 8/1996 | (WO) . |

OTHER PUBLICATIONS

Intel, "Intel 486DX Microprocessor Data Book", pp. 148, and 165–169, Jun. 1991.
Intel, "Chapter 2: Mircoprocessor Architecture Overview," 1994, pp. 2–1 through 2–4.

(List continued on next page.)

Primary Examiner—John F. Niebling
Assistant Examiner—Stacy Whitmore
(74) Attorney, Agent, or Firm—Conley, Rose & Tayon, PC; Robert C. Kowert

(57) ABSTRACT

A microprocessor having a standard register set and an extended register set, which is configured to save its state upon suspension of either an extended register process or a standard register processor. The microprocessor is configured to execute both standard register instruction sequences and extended register instruction sequences. A first memory is provided for storing a state of the microprocessor when a standard register instruction set sequence is suspended. The microprocessor further comprises a second memory for storing a microprocessor state upon suspension of the microprocessor executing an extended register instruction set sequence. An extended state save circuit coupled between a microprocessor core and the second memory allows the extended state of the microprocessor to be stored without modification of the operating system. As a result, the extended state of the microprocessor can be saved transparently to the operating system.

38 Claims, 13 Drawing Sheets

U.S. PATENT DOCUMENTS

| | | |
|---|---|---|
| 4,928,223 | 5/1990 | Dao et al. . |
| 4,972,338 | 11/1990 | Crawford . |
| 5,008,812 * | 4/1991 | Bhandarker .......................... 395/569 |
| 5,053,631 | 10/1991 | Perlman et al. . |
| 5,058,048 | 10/1991 | Gupta et al. . |
| 5,109,334 | 4/1992 | Kamuro . |
| 5,125,087 | 6/1992 | Randell . |
| 5,129,067 | 7/1992 | Johnson . |
| 5,136,697 | 8/1992 | Johnson . |
| 5,146,569 * | 9/1992 | Yamaguchi .......................... 395/569 |
| 5,226,126 | 7/1993 | McFarland et al. . |
| 5,226,130 | 7/1993 | Favor et al. . |
| 5,226,132 | 7/1993 | Yamamoto . |
| 5,274,834 | 12/1993 | Kardach . |
| 5,293,592 | 3/1994 | Fu et al. . |
| 5,303,358 | 4/1994 | Baum . |
| 5,321,836 | 6/1994 | Crawford . |
| 5,355,490 * | 10/1994 | Kou ...................................... 395/653 |
| 5,375,213 | 12/1994 | Arai . |
| 5,386,563 * | 1/1995 | Thomas ................................ 395/569 |
| 5,438,668 | 8/1995 | Coon et al. . |
| 5,471,593 | 11/1995 | Branigan . |
| 5,481,684 | 1/1996 | Richter et al. . |
| 5,560,032 | 9/1996 | Nguyen . |
| 5,561,784 | 10/1996 | Chen . |
| 5,651,125 | 7/1997 | Witt . |
| 5,671,422 * | 9/1997 | Datta .................................... 395/734 |
| 5,680,578 | 10/1997 | Dutton et al. . |
| 5,689,672 | 11/1997 | Witt . |
| 5,740,461 * | 4/1998 | Jaggar ............................. 395/800.41 |
| 5,758,116 | 5/1998 | Lee et al. . |
| 5,765,035 | 6/1998 | Tran . |
| 5,768,574 | 6/1998 | Dutton et al. . |
| 5,787,474 | 7/1998 | Pflum . |
| 5,805,918 * | 9/1998 | Blomgren et al. ..................... 712/43 |
| 5,809,273 | 9/1998 | Favor et al. . |
| 5,812,823 * | 9/1998 | Kahle .................................... 395/500 |
| 5,813,033 | 9/1998 | Pflum . |
| 5,819,080 | 10/1998 | Dutton et al. . |
| 5,822,778 | 10/1998 | Dutton . |
| 5,835,753 | 11/1998 | Witt . |
| 5,838,984 | 11/1998 | Nguyen et al. . |
| 5,848,284 | 12/1998 | Harshvardhan . |
| 5,848,287 | 12/1998 | Tran et al. . |
| 5,903,910 | 5/1999 | Tran et al. . |
| 5,905,900 | 5/1999 | Combs . |
| 6,009,512 | 12/1999 | Christie . |
| 6,014,739 | 1/2000 | Christie . |

OTHER PUBLICATIONS

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Stop?, " PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, vol. 1: Basic Architecture*", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm), No Date.

Kathail et al., HPL Playdoh Architecture Specification: Version 1.0, Hewlett Packard, Computer Systems Laboratory, HPL–93–80, Feb., 1994, pp. 1–48.

Intel Microprocessors: vol. I, 1993, pp. 2–1,2–18 to 2–26, 2–79 to 2–83 and 2–121 to 2–122.

Intel Microprocessors: vol. II, 1993, pp. 2–2,2–19 to 2–26, 2–80 to 2–83 and 2–122.

IEEE Mirco, vol. 13, No. 5, Oct. 1, 1993, pp. 24–36, Makato Awaga et al, "The VP 64–Bit Vector Coprocessor: A New Implementation of High–Performance Numerical Computation."

Johnson, et al., "Analysis Techniques for Predicated Code", Hewlett–Packard Laboratories, IEEE, 1996, pp. 100–113.

* cited by examiner

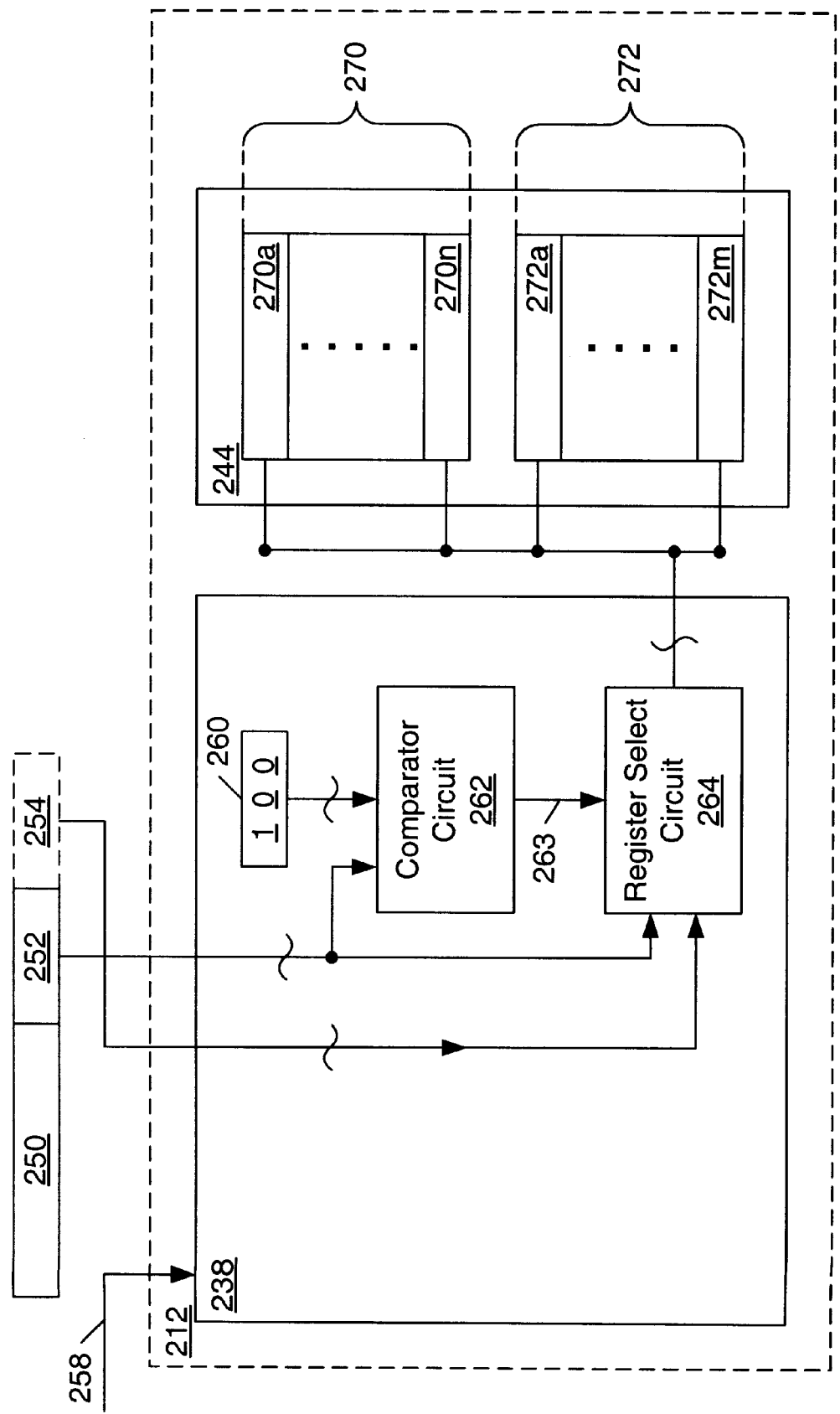

Fig. 8

| 31 | 12 | 11 | 9 | 8 | 7 | 6 | 5 | 4 | 3 | 2 | 1 | 0 |
|---|---|---|---|---|---|---|---|---|---|---|---|---|
| Frame Page Address | | AVAIL | | EXR | O/PG | D/0 | A | PCD | PWT | U | W | P |

EXR: Enable Extended Register space (bit 8)

Fig. 9

| m+7 | m+6 | m+5 | m+4 | m+3 | m+2 | m+1 | m |
|---|---|---|---|---|---|---|---|
| Base 31...24 | Attributes | | Segment Base 23...0 | | | Segment Limit 15...0 | | m+6:
| 7 | 6 | 5 | 4 | 3 | 2 | 1 | 0 |
|---|---|---|---|---|---|---|---|
| G | D | EXR | AVL | Limit 19...16 | | | | m+5:
| 7 | 6 | 5 | 4 | 3 | 2 | 1 | 0 |
|---|---|---|---|---|---|---|---|
| P | DPL | | DT1 | TYPE | | | |

EXR: enable extended register space (bit 5)

TRANSPARENT EXTENDED STATE SAVE

BACKGROUND OF THE INVENTION

1. Field of the Invention

This invention relates to microprocessors, and more particularly to a method and apparatus for saving an extended state of a microprocessor.

2. Description of the Relevant Art

Microprocessor manufacturers continue to develop new products which execute X86 instructions in order to maintain compatibility with the vast amount of software developed for previous X86 processor generations—the 8086/8, 80286, 80386, and 80486. Maintaining software compatibility has forced many architectural compromises in newer products. In order to retain the functions of earlier products, hardware has often been simply modified or extended in order to increase capability and performance.

The X86 instruction set (hereinafter also referred to as the standard instruction set) is relatively complex and is characterized by a plurality of variable byte length instructions. The instructions, when executed by a microprocessor, can access X86 standard or general purpose(e.g., EAX, EBX, ECX, EDX, EBP, ESI, EDI ESP) registers. A generic format illustrative of the X86 instruction set is shown in FIG. 1. As illustrated in the figure, an X86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a operation string a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest X86 instructions are only one byte long, and comprise a single opcode byte. The 80286 sets a maximum length for an instruction at 10 bytes, while the 80386 and 80486 both allow instruction lengths of up to 15 bytes.

FIGS. 2 and 3 illustrate the internal fields associated with the Mod R/M byte and of the SIB byte, respectively. References to a register of the X86 architecture may appear within the REG/OP or the R/M field of the Mod R/M byte, or within the index field and base field of the SIB byte. (A register address may alternatively be implied by an opcode.) Thus, there are four possible references to a register in an X86 instruction (although only three register references may appear in any particular instruction). The REG/OP and R/M fields in the Mod R/M byte can specify the source and destination registers, and the base and index fields in the SIB byte can specify the base and index registers used in operand address calculations for memory accesses.

A significant deficiency of the X86 architecture is the small number of standard registers. Typical RISC processors have at least thirty-two standard registers, as opposed to eight for the X86. A larger standard register set allows more operands to be stored in the faster-access register file, rather than in relatively slow memory. Modern compilers are also able to take advantage of a larger number of registers to expose greater instruction level parallelism for increased superscalar execution performance. In addition to the limited number of standard X86 registers, use of them by the compiler is complicated by the fact that most have special implicit uses in various instructions. Extending the number of standard registers would alleviate these limitations. However, extending the number of standard registers creates problems with saving the state of a suspended process employing the extended register set. Normally, when a microprocessor suspends one process to begin a new process, the operating system is intensely involved with saving the state of the suspended process until it is restarted. Generally, the state of the suspended process, including the contents of the standard at the registers point of suspension, is saved in main memory until it is recalled for further processing.

The operating system is configured to save the state of X86 processes, i.e., processes employing the standard X86 registers. Unless the operating system is reconfigured, the operating system may not be able to save the state of processes employing the extended register set. Reconfiguring the operating system to take advantage of applications of microprocessor extensions can be expensive and time consuming.

SUMMARY OF THE INVENTION

The problems identified above are in large part addressed by a microprocessor having a standard register set and an extended register set, which can save the state of a process employing the extended register set without requiring a modification of existing operating system configured to save the state of a process employing the standard register set.

The microprocessor of the present invention includes a core which is configured to execute both standard register processes and extended register processes. A first memory is provided for storing standard register process states when a standard register process executing on the microprocessor core is suspended. A second memory is provided for storing extended register process states when an extended register process executing on the microprocessor core is suspended. An extended state save circuit coupled between the microprocessor core and second memory saves the extended state of the microprocessor core in the second memory upon extended register process suspension.

The extended state save circuit saves the microprocessor state into the second memory when the microprocessor core receives an instruction to suspend execution of an extended register process. The second memory is configured as a plurality of buffers several of which may be allocated to currently running (i.e., active) extended processes or to suspended extended register processes. Several of the buffers may not be allocated to extended processes. A memory array having a plurality of entries is also provided, each entry corresponding to one of the buffers within the second memory. Each entry within the memory array contains information indicating whether its corresponding buffer is allocated. Before a new extended register process executes, the extended state save circuit accesses the memory array to identify a buffer which has not been allocated. When a unallocated or free buffer is identified, it is allocated by the extended state save circuit to the new extended register process.

A memory buffer identification register is also provided for storing a memory buffer identifier identifing a memory buffer in which an extended register process is saved upon suspension thereof Thus, when an extended process is suspended, the extended state save circuit saves the state of the microprocessor core including the contents of the extended register set into the buffer identified by the buffer identification register. The identifier within the buffer identification register is saved so that in the future the microprocessor core can be restored to the state it held prior to suspension of the extended register process. Namely, when the suspended process it to be restarted, the extended state save circuit resets the microprocessor core including the extended registers with the contents of the buffer specified by the saved buffer identifier.

One advantage of the present invention is that it saves the state of an extended process.

Another advantage of the present invention is that it saves the state of an extended process without requiring modification of existing operating systems.

Yet another advantage of the present invention is that it allows applications written to employ the extended register set to take advantage of existing standard register set libraries.

BRIEF DESCRIPTION OF THE DRAWINGS

Other objects and advantages of the invention will become apparent upon reading the following detailed description and upon reference to the accompanying drawings in which:

FIG. 6 is a block diagram of the extended register microprocessor of FIG. 4 showing additional details of an instruction decode unit and a register file;

FIG. 8 is a diagram of a page directory/page table entry format suitable for use in an embodiment of the present invention in which the extension registers can be enabled or disabled;

FIG. 9 is a diagram of a memory segment descriptor format suitable for use with an embodiment of the present invention in which the extension registers may be enabled or disabled;

Figure 1:
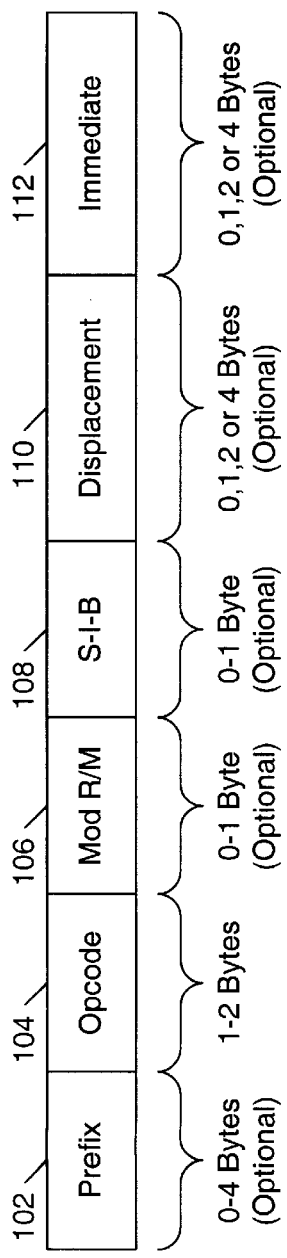
FIG. 1 is a diagram which illustrates the format for X86 instructions.
Figure 2:
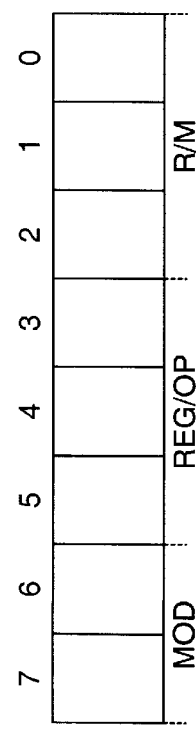
FIG. 2 is a diagram which illustrates the format of a Mod R/M byte of an X86 instruction.
Figure 3:
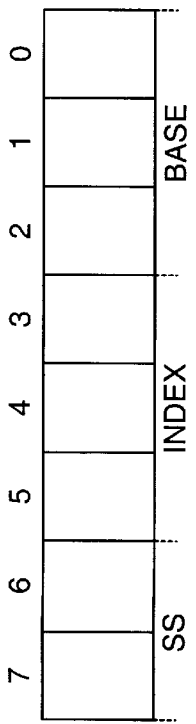
FIG. 3 is a diagram that illustrates the format of the SIB byte.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
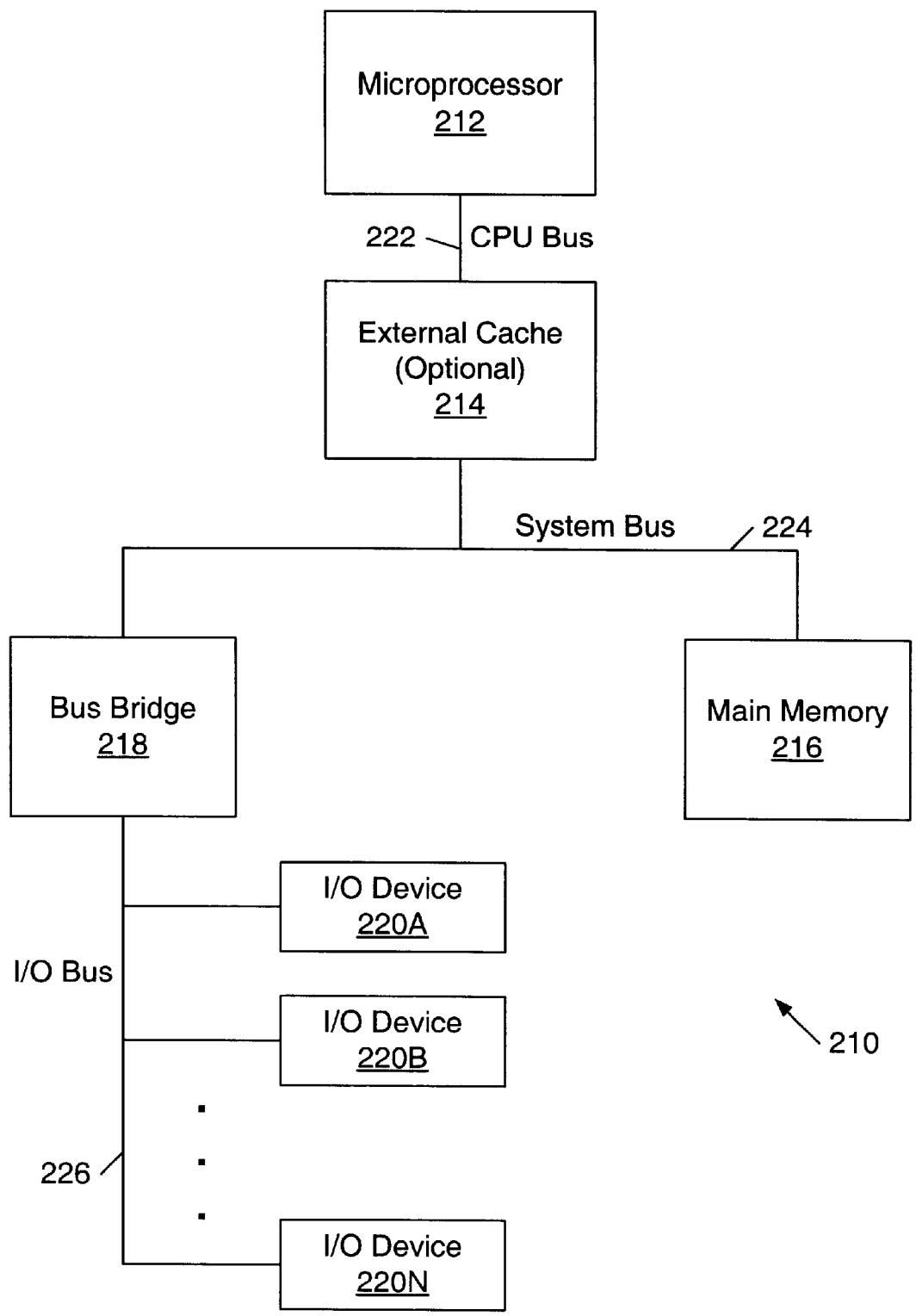
FIG. 4 is a block diagram of a computer system including an extended register set microprocessor employing a mechanism and method for saving the state of a process employing the extended register set in accordance with the present invention.

Turning now to FIG. 4, a block diagram of one embodiment of a computer system 210 including an extended register set microprocessor 212 employing the present invention, an external cache 214, a main memory 216, a bus bridge 218, and a plurality of input/output (I/O) devices 220A–220N (collectively referred to as I/O devices 220) is shown. Microprocessor 212 is coupled via a CPU bus 222 to optional external cache 214. External cache 214 is coupled via a system bus 224 to main memory 216 and bus bridge 218. Bus bridge 218 is coupled to I/O devices 220 via an I/O bus 226.

Before discussing specific details regarding features of the present invention, the units of computer system 210 will be described. Generally speaking, microprocessor 212 fetches (or transfers) instructions from main memory 216 and executes the instructions. Data stored in main memory 216 may be operated upon by the instructions. Instructions and data reside at addresses within main memory, wherein an address is a value which identifies a storage location or locations within main memory 216. The address formed by microprocessor 212 to fetch instructions is referred to as the "instruction fetch address". Additionally, the term "data address" refers to the address formed by microprocessor 212 to transfer data. Instruction fetch and data addresses are translated by microprocessor 212 prior to presentation upon CPU bus 222. It is noted that instructions and data are typically placed into main memory 216 by an I/O device 220 such as a disk drive.

External cache 214 is a relatively small (as compared to main memory 216) cache memory configured to store instructions and data previously accessed by microprocessor 212. Generally speaking, accesses to external cache 214 may be performed in substantially less time than accesses to main memory 216. In one embodiment, external cache 214 comprises at least one static random access memory (SRAM) and a cache controller configured to manage the storage of data within the SRAM. External cache 214 may be configured to be a write through cache, in which any updates to data stored within the cache are also performed to main memory 216 at substantially the same time. Alternatively, external cache 214 may be configured to be a store-in or copyback cache in which updates to data stored within the cache are performed to main memory 216 in a delayed fashion. The updates are performed when the associated cache line is discarded from external cache 214. In yet another embodiment, external cache 214 may be configured to be write through or copyback on a line-by-line basis. It is noted that external cache 214 is an optional component. If external cache 214 is not included within an embodiment of computer system 210, then microprocessor 212 is coupled directly to system bus 224.

As previously mentioned, main memory 216 is configured to store instructions and data for use by microprocessor 212. Additionally, main memory 216 stores address translation information used by microprocessor 212 to translate virtual addresses to physical addresses. The format and storage locations of the address translation information are defined by the microprocessor architecture employed by microprocessor 212. In one embodiment, main memory 216 comprises at least one dynamic random access memory (DRAM) and a DRAM controller.

Bus bridge 218 is configure d to effect communications between I/O devices 220, main memory 216, and microprocessor 212. It is noted that system bus 224 and CPU bus 222 are typically high bandwidth, high speed buses to allow large amounts of data to be transferred between microprocessor 212, external cache 214, and main memory 216. I/O devices 220 are typically devices which do not require such high bandwidth, and may not be capable of the high frequency switching of system bus 224 and CPU bus 222. Bus bridge 218 therefore provides a buffer between I/O bus 226 (typically a lower speed, lower bandwidth bus than system bus 224 and CPU bus 222) and system bus 224. Additionally, system bus 224 and CPU bus 222 may employ a different bus protocol than I/O bus 226. Bus bridge 218 provides a translation between the different protocols. In one embodiment, I/O bus 226 is a Peripheral Component Interconnect (PCI) bus. In another embodiment, I/O bus 226 is an Industry Standard Architecture (ISA) bus. In still another embodiment, I/O bus 226 is an Enhanced ISA (EISA) bus. Different embodiments of bus bridge 218 may be used for the different embodiments of I/O bus 226. Additional bus bridges similar to bus bridge 218 may be attached to system bus 224 and/or I/O bus 226.

I/O devices 220 are configured to effect communications between computer system 210 and other devices coupled thereto. For example, I/O devices 220 may include a serial or parallel card for connecting devices such as printers or external modems to computer system 210. Additional I/O devices 220 may include a modem, a sound card, a network adapter, etc. I/O devices 220 typically include at least one storage device as well. Storage devices may be hard disk drives, floppy disk drives, and compact disk, read-only-memory (CD-ROM) drives. It is noted that I/O devices 220 may also be referred to as peripheral devices.

It is noted that CPU bus 222 and system bus 224 may be configured according to the same bus protocol or, alternatively, to different bus protocols. Many varied bus protocols are well known, and any bus protocol may be suitable for CPU bus 222 and system bus 224. It is further noted that, although FIG. 4 shows a computer system 210 including a single microprocessor 212, other embodiments of computer system 210 including multiple processors are contemplated. Such embodiments may include multiple processors coupled to an external cache, multiple processors coupled to multiple external caches, or multiple processors coupled to system bus 224.

For simplicity of the following discussion, information may be referred to as being stored in main memory 216. However, it is understood that a variety of caches similar to external cache 214 may store the information as well. Caches internal to microprocessor 212 may additionally store such information. The information may be accessed from these locations as well.

Figure 5:
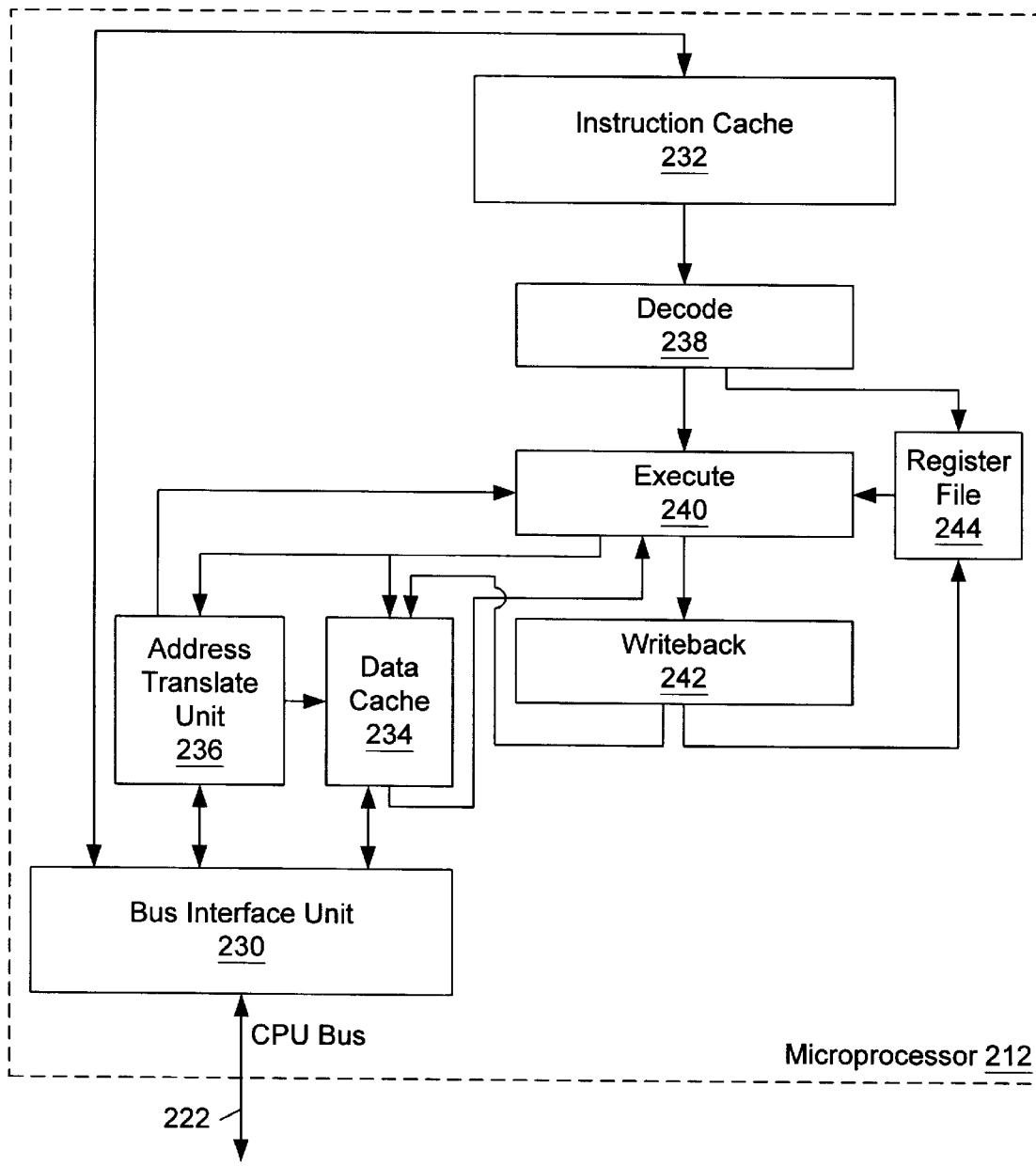
FIG. 5 is a block diagram illustrating certain elements of the extended register set

Turning now to FIG. 5, elements of an extended register set microprocessor 212 is shown in greater detail. Microprocessor 212 includes a bus interface unit 230 coupled to an instruction cache 232, a data cache 234, and an address translation unit 236. Microprocessor 212 further includes an instruction processing pipeline comprising a decode stage 238, an execute stage 240, and a writeback stage 242. Additionally, a register file 244 is included with registers defined by the instruction set architecture employed by microprocessor 212. Address translation unit 236 is coupled to instruction cache 232, data cache 234, and execute stage 240. Data cache 234 is additionally coupled to execute stage 240 and write back stage 242. Register file 244 is coupled to decode stage 238, execute stage 240, and writeback stage 242. Finally, instruction cache 232, decode stage 238, execute stage 240, and writeback stage 242 are serially connected.

Generally speaking, instructions are fetched from instruction cache 232 and decoded by decode stage 238. Register operands are detected by decode stage 238, and appropriate register operand values are requested from register file 244. Register file 244 conveys the requested values to execute stage 240. During the same clock cycle, the decoded instruction is transferred from decode stage 238 to execute stage 240. In this manner, the instruction and its operands typically are provided to execute stage 240 during the same clock cycle. Execute stage 240 executes the instruction, including forming data addresses for memory operands and transmitting the data addresses to data cache 234 and address translation unit 236. Memory operands operated upon by the instruction are returned to execute stage 240 for continued instruction operation. The result of executing the instruction is stored into a destination operand by writeback stage 242. If an instruction utilizes the result of a previous instruction which is in writeback stage 242 or execute stage 240 when the instruction is in execute stage 240 or decode stage 238, then the result of the previous instruction may be forwarded to the instruction directly. Such a forwarding structure may eliminate the pipeline stalls associated with such instruction dependencies when all operands are read from register file 244.

Address translation unit 236 is configured to translate instruction fetch addresses and data addresses from a virtual address to a physical address. Address translation information, stored in main memory, may be transferred to address translation unit 236 from main memory 216 in order to effect the translation. In the embodiment shown in FIG. 5, address translation unit 236 is accessed by data addresses prior to accessing data cache 234. Address translation unit 236 provides the translated address to data cache 234 for use in determining if the requested data is stored in data cache 234. Instruction cache 232 transmits a virtual instruction fetch address to address translation unit 236 and uses the translated instruction fetch address similarly. If an address may not be translated by information stored within address translation unit 236, then the respective cache access is stalled until the translation may be performed. If no translation information is available to correctly translate the address, then an exception is signaled to the requesting unit. An exception causes instruction execution to begin at an exception address. The exception routine stored at the exception address may attempt to create address translation information for the address, for example.

Address translation unit 236 may include one or more translation storages for storing address translation information. A translation storage includes a plurality of storage locations for storing address translation information. By storing address translation information within address translation unit 236, address translation may be performed more efficiently. Without translation storage, each address translation would involve a bus transaction upon CPU bus 222 to collect the address translation information. More than one bus transaction may be involved, depending upon the format and location of the address translation information.

When address translation unit 236 includes a translation storage, instructions which modify translation information are detected by address translation unit 236 in order to maintain coherency between the information stored in the translation storage and the information stored in main memory 216. If modification occurs, address translation unit 236 discards at least the affected information. During a subsequent address translation utilizing the affected information, the information is transferred from main memory 216.

Instruction cache 232 is a high speed cache memory for storing instructions prior to their execution by microprocessor 212. It is noted that instruction cache 232 may be configured into a set associative, direct-mapped, or fully associative configuration. Instruction cache 232 additionally includes an instruction fetching mechanism configured to fetch instructions from instruction cache 232 according to the instruction fetch address. The instruction fetch address may be the address indicative of the next instruction to be fetched, or may be a branch prediction address formed via prediction of the target and direction of a branch instruction. The branch prediction mechanism may also be included within instruction cache 232. Many suitable branch prediction mechanisms are well known. The instruction fetch address may further be affected by the detection of an exception, in which case the instruction fetch address is the exception address. Instructions fetched from instruction cache 232 are transferred to decode stage 238 for decoding and execution as described above.

Instruction cache 232 transfers the instruction fetch address to address translation unit 236 prior to accessing the instruction storage, according to the embodiment of FIG. 5. The physical address returned is used to access instruction cache 232. If one of the address tags stored within instruction cache 232 and the physical address compare equal, then the associated instructions are stored at the address in main memory 216 corresponding to the instruction fetch address. The associated instructions may therefore be sent to decode stage 238 for decoding and execution. Instruction cache 232 is referred to as a physically addressed cache, since the addresses associated with the instructions stored therein are physical addresses.

It is noted that instruction cache 232 may be configured not to access address translation unit 236 during each instruction fetch. Instead, instruction cache 232 may fetch instructions from addresses having the same translation as a previous address. For such an embodiment, information indicative of a range of virtual addresses which may be translated with the same translation information as a particular instruction fetch address is conveyed to instruction cache 232 along with the translation of the particular instruction fetch address. If a subsequent fetch address falls within the range of virtual addresses, then the address translation may be formed by instruction cache 232.

Additionally transferred from address translation unit 236 to instruction cache 232 during a virtual to physical address translation is a default operand and addressing mode translation attribute. In one embodiment, the default operand and addressing mode translation attribute is indicative of either a 16 bit, 32 bit, or 64 bit operand and addressing mode. Operands and data addresses for instructions residing at the instruction fetch address include the number of bits specified by the operand and addressing mode translation attribute. For example, in 64 bit operand and addressing mode, 64 bit register values are accessed within register file 244. Additionally, 64 bit addresses are formed for accessing data cache 234 and 64 bit memory operands are accessed. Each instruction transferred to decode stage 238 includes the default operand or addressing mode translation attributes, such that the appropriately sized operands and addresses are formed. In one embodiment, the default operand and addressing mode translation attribute comprises a pair of bits. The pair of bits may be encoded to indicate each of the possible operand and addressing modes. It is noted that register file 244 stores 64 bit register quantities. However, register file 244 may access an 8 bit, 16 bit, or 32 bit portion of a register quantity dependent upon the operand and addressing mode associated with a particular instruction.

Upon decode of an instruction within decode stage 238, the default operand and addressing mode may be overridden. Certain instructions may be defined to access a particular size of operands or to generate a particular size address. Changing the default operand and addressing mode for these instructions enables compatibility with previous software which may not operate correctly using larger operands and addresses. In one embodiment, the operand and addressing mode is overridden via an instruction field. An instruction field is a portion of an instruction comprising at least one bit Instructions typically include instruction fields which comprise an opcode field and one or more operand fields. Instructions may additionally encode a displacement field which includes a constant value for use in address generation and an immediate field which includes a constant value for use by the instruction. Additionally, an instruction field may be included which changes the operand and addressing mode for the instruction to a particular operand and addressing mode, regardless of the default operand and addressing mode. An instruction which overrides the default operand and addressing mode changes the default operand and addressing mode for that instruction only. Subsequent instructions utilize the default operand and addressing mode defined by address translation unit 236 unless the subsequent instructions include similar address and operand mode override instruction fields.

Data cache 234 is a high speed cache memory for storing data accessed by the instructions executed by microprocessor 212. It is understood that data cache 234 may employ a set associative or direct mapped configuration. Similar to instruction cache 232, data cache 234 is physically addressed and therefore receives the physical address from address translation unit 236 to determine if requested data is stored within data cache 234.

Both data cache 234 and instruction cache 232 may determine that requested data or instructions are not currently stored in the cache. Bus interface unit 230 is configured to communicate upon CPU bus 222 in order to transfer instructions and data to the respective caches. Additionally, bus interface unit 230 may transfer address translation information from main memory to address translation unit 236. Address translation unit 236 may request address translation information if a particular address cannot be translated according to address translation information stored within the address translation unit. Furthermore, address translation unit 236 may request address translation information if an instruction is executed which changes address translation information.

It is noted that, although decode stage 238, execute stage 240, and writeback stage 242 are shown as individual stages in FIG. 5, each stage may include multiple substages. The stages employed by a particular microprocessor are defined according to the design of the microprocessor, the microprocessor architecture employed by the microprocessor, and the desired clock cycle time. Other factors may be considered as well.

It is further noted that address translation unit 236 may be accessed in parallel with data cache 234 and instruction cache 232. Embodiments of microprocessor 212 with allow such access may include an address translation mechanism in which a number of address bits are defined to be unchanged by the translation. These unchanged address bits may be used to index into the cache, and then the translated address is compared to one or more address tags to determine if the cache stores the bytes corresponding to the translated address. Other embodiments of microprocessor 212 may include an address translation structure which does not define address bits which are unchanged by the translation (i.e. the X86 microprocessor architectures segmentation mechanism). The index into the cache is performed with the untranslated address, and if the index bits are actually changed by the translation than the access is abandoned and an access using the translated address is performed.

Additional information regarding microprocessors may be found within the commonly assigned, co-pending patent application entitled "High Performance Superscalar Microprocessor", Ser. No. 08/146,2382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377843, filed Jan. 25, 1995 by Witt, et al. The disclosures of these patent applications are incorporated herein by reference in their entirety.

Turning now to FIG. 6, a block diagram of microprocessor 212 elements is shown. In the preferred embodiment, microprocessor 212 includes an instruction decode unit 238 adapted to receive a microprocessor instruction 250 of standard or extended format more fully described below. Microprocessor instruction 250 includes an extension register key field 252. Instruction decode unit 238 is configured to access the contents of a selected extension register of an extension register set (hereinafter also referred to as a extended set of registers) 272 in response to receiving microprocessor instruction (extended instruction) 250 with extension register key field 252 containing an extension register key value. Instruction decode unit 238 is further adapted to access the contents of a selected standard register of a standard register set 270 in response to receiving microprocessor instruction (standard instruction) 250 with extension register key field 252 not equal to a extension register key value. In the embodiment shown in FIG. 6, the value of extension register key field 252 is routed to a comparitor circuit 262. An extension register key value register 260 can be programmed to contain the extension register key value. In the embodiment shown in FIG. 6, the extension register key value register 260 contains an extension register key value of 1-0-0. The contents of extension register key value register 260 are routed to comparitor circuit 262 and compared with the contents of extension register key field 252 of microprocessor instruction 250. If the contents of extension register key field 252 equal the contents of extension register key value register 260, comparitor circuit 262 is configured to produce a positive signal on comparator output 263. If, on the other hand, the contents of extension register key field 252 are not equal to the contents of extension register key value register 260, then comparitor circuit 262 is configured to output a negative signal on comparator output 263. Output signal 263 of comparitor circuit 262 is routed to a register select circuit 264. In addition, the contents of extension register key field 252 are routed to register select circuit 264. In this embodiment, it is contemplated that, when the contents of extension register key field 252 are not equal to the contents of extension register key value register 260, then the bits comprising extension register key field 252 are interpreted as information used to identify a selected standard register of standard register set 270. In one embodiment, the information in extension register key field 252 is used to select the selected standard register of standard register set 270 by indexing standard register set 270. In other words, the value of extension register key field 252 forms an index into standard register set 270 to identify a selected standard register of standard register set 270 when the contents of the extension register key field 252 do not equal the contents of extension register key value register 260. Microprocessor designers and programmers familiar with X86 architecture and instruction formatting will recognize that the format of microprocessor instruction 250 is similar to the format of an X86 microprocessor instruction. In the typical X86 instruction format, a 1-0-0 value in the r/m field of the microprocessor instruction informs the microprocessor that an additional field (sib byte) will be appended to the microprocessor instruction. It will be futher appreciated that the architectural modifications required to a standard X86 microprocessor may be minimized if the extension register key field 252 and the extension register key value are compatible with an analogous field and value of a standard X86 microprocessor. In this embodiment, it is contemplated that extension register key field 252 of microprocessor instruction 250 occupies the least significant 3 bits of the microprocessor instruction byte following the opcode byte. A diagram of a microprocessor instruction suitable for use with the present invention is shown in FIG. 7a and is discussed in greater detail below.

Instruction 250 can be a standard instruction (key field does not equal extension register key value) or a extended instruction (key field does equal extension register key value). The multiple use of extension register key field 252 beneficially minimizes the length of microprocessor instruction 250. It will be appreciated, however, that when extension register key field 252 contains the extension register key value, the information necessary to select one of the extension registers of extension register set 272 must be stored in additional bit locations of microprocessor instruction 250. FIG. 6 represents this additional information as extension register field 254 shown in dotted outline to indicate that extension register field 254 is appended to microprocessor instruction 250 only when extension register key field 252 contains the extension register key value. Thus, microprocessor instruction 250 further includes an extension register field 254 when a value of extension register key field 252 is equal to an extension register key value. Furthermore, as shown in FIG. 6, the contents of extension register field 254 are routed to register select circuit 264 along with the contents of extension register key field 252. In this manner, the contents of extension register field 254 (when present) are used to select a selected extension register within extension register set 272 of register file 244. Preferably, the selected register within extension register set 272 is selected by using the information contained in extension register field 254 to index extension register set 272. The presence of an extension register field 254 in some microprocessor instructions 250 (i.e., extended instructions which contain the extension register key value within extension register key field 252) and the absence of extension register field 254 in other microprocessor instructions (i.e., standard instructions in which the extension register key field does not contain the extension register key value) highlight that, in the presently preferred embodiment, instruction decode unit 238 is adapted to receive a variable length microprocessor instructions 250 from different instruction sets.

In the embodiment shown in FIG. 6, an EXT 258 bit is routed to instruction decode unit 238. In embodiments of the present invention incorporating such a signal, the enabling and disabling of extension register operation may be controlled by altering the state of EXT 258. The existence of a large base of application software written in X86 instruction format makes it beneficial to permit this application software base to be executed upon the microprocessor 212 of the present invention without recompilation. By controlling the enabling and disabling of the extension register set with a software controllable signal, one embodiment of the present invention contemplates a microprocessor compatible with existing X86 software but capable, nevertheless, of executing programs written with extension register set capabilities of the present invention. When EXT 258 is in a first state, then instruction decode unit 238 operates in the manner described in previous paragraphs with respect to the present invention. In other words, the instruction decode unit compares the contents of extension register key field 252 with an extension register key value and accesses a register from extension register set 272 if the key field contains the key value. If key field 252 does not contain the key value, instruction decode unit 238 accesses a register within the standard register set 270 of register file 244. If instruction signal 258 is in a second state, however, extension register operation is disabled. In one embodiment, microprocessor 212 effectively functions as a standard X86 microprocessor when instruction register signal 258 is in a second state.

In FIG. 6, register file 244 is organized as a standard register set 270 and a separate extension register set 272. Special extended register set instructions may move data between the standard and extended registers. The standard registers may map to extended registers so that the standard registers can be modified when microprocessor 212 is in the extended register mode of operation. The EIP and ESP registers should map to functionally identical extended registers. This allows EIP and ESP values when the microprocessor is in standard or extended mode, to be coherent thereby facilitating interaction between the modes.

Figure 7C:
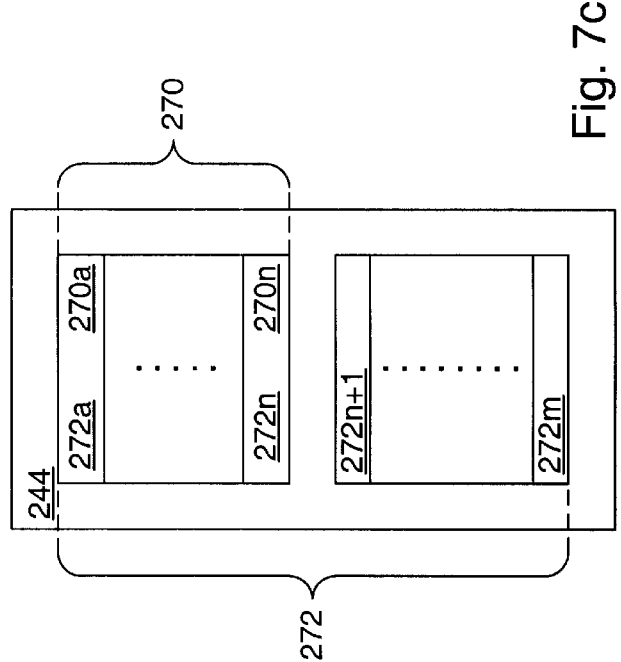
FIG. 7c is a block diagram of an alternative embodiment of the file register shown in FIG. 6.
Figure 7A:
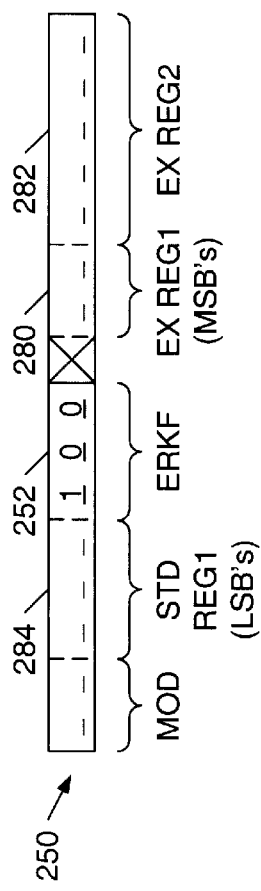
FIGS. 7a and 7b are diagrams of microprocessor instructions suitable for use with the extended register microprocessor of FIG. 4.

An alternative embodiment of register file 244 is shown in FIG. 7c. In the register file 244 shown in FIG. 7c, extension register set 272 includes standard register set 270. In this embodiment, the standard register set 270 forms the least significant registers of register file 244. Alternatively the standard registers may form the lower portions of the least significant registers of register file 244. Extension register set 272 includes all of the registers contained within standard register 270 and the additional register sets shown in FIG. 7c as the registers 272 n+1 to register 272 m. The embodiment of register file 244 shown in FIG. 7c advantageously minimizes the number of registers required. If, for example, standard register set 270 comprises 8 registers and extension register set 272 includes 32 registers, then 40 registers would be required in the embodiment of register file 244 shown in FIG. 6 whereas only 32 registers, are required to implement the register file architecture shown in FIG. 7c. The architecture of register file 244 shown in FIG. 7c results in a correspondence between the registers of standard register set 270 and the least significant registers of extension register set 272. The correspondence between the registers of standard register set 270 and a portion of the extension register set 272 provides an architecture in which the addressing of extension register set 272 may be accomplished by simply concatenating additional bits onto the standard register reference field used to address standard register set 270.

This concatenation of register addressing bits is implemented in the embodiment of the present invention used with the microprocessor instruction 250 shown in FIG. 7a. A typical microprocessor instruction 250 of the present invention includes a first and a second register reference. In a typical instruction, the first register reference may be the source register providing the information (or the address of the memory location containing the information) that will be manipulated by the particular microprocessor operation. The second register reference provides a target register (or the address of a target memory location) to which the manipulated information will be ultimately stored. In an extended register set microprocessor, it is required that the extension register set is available both as a target or source register and as a destination register. To accommodate the first and second register references and the extension register set, the present invention contemplates that microprocessor instructions which require use of the extension register set will signify to the microprocessor with the extension register key field described previously. The instruction decode unit is configured to interpret an additional byte appended to the mod r/m byte of the microprocessor instruction when extension register key field 252 contains the extension register key value. The additional byte appended to the microprocessor instruction contains, in a presently preferred embodiment, a 5 bit field for the second extension register reference and a 2 bit first register field that is concatenated with a three bit first register field of the mod r/m byte of the microprocessor instruction. Turning to FIG. 7a, two bytes of a microprocessor instruction 250 are shown. The first or mod r/m byte of microprocessor instruction 250 includes a two bit mod field, a three bit first register reference field 284, and the extended register key field 252 as described previously. Assuming for purposes of this example that the extension register key value is 1-0-0, then an additional byte is appended to mod r/m byte of microprocessor instruction 250 if extended register key field 252 equals 1-0-0. The additional byte appended to mod rim byte of microprocessor instruction 250 includes a 5 bit second register reference field 282 and a 2 bit extended first register reference field 200. The two bits of extended first register reference field 280 are appended or concatenated to the 3 bit first standard reference field 284 in the mod r/m byte so that the two-bit field 280 forms the most significant bits of the 5-bit concatenated field. The 5 bit second register field 282 contains the information necessary to identify one of the selected extension register sets. It will be appreciated to those skilled in the art of microprocessor architecture and programming that the 3-bit fields associated with the standard register references typically imply a register set comprising a maximum of eight registers whereas the 5 bit field of the extension register set implies a maximum of 32 registers.

Thus, instruction decode unit 238 in one embodiment is configured to receive a microprocessor instruction 250 that includes a first register reference and a second register reference. The first register reference and a second reference are indicative of first and second selected registers respectively. Microprocessor instruction 250 further includes operating mode information that is indicative of whether the instruction decode unit 238 is operating in a standard register mode or an extension register mode. In one embodiment, the operating mode information may simply comprise the extended register key field 252. If the extended register key field 252 contains an extended register key value, then instruction decode unit 238 is operating in an extension register mode and instruction decode unit 238 is configured to access the contents of first and second selected registers in response to receiving the microprocessor instruction 250. The first and second registers a relocated within the standard register set 270 if the instruction decode unit is operating in a standard register mode whereas the first and second selective registers are located within the extension register set 272 when instruction decode unit 238 is operating in extension register mode.

Figure 7B:
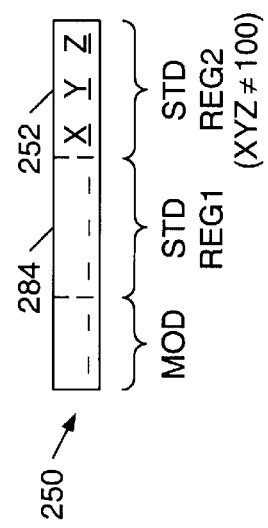

FIGS. 7a and 7b show differing formats for specific bytes of microprocessor instruction 250 depending upon the operating mode of the instruction decode unit 230. Microprocessor instruction 250, as shown in FIG. 7a, includes a first extension register field 280 and a second extension register field 282 when instruction decode unit 238 is operating in the extension register mode. The instruction decode unit 238 uses first and second extension register fields 280 and 282 to select the first and second selected registers. In one embodiment, instruction decode unit 238 uses the first extension register key field 280 and a first standard register field 284 of microprocessor instruction 250 to select the first selected register when the instruction decode unit is operating in the extension register mode. Preferably, instruction decode unit 238 concatenates first extension register field 280 onto first standard register field 284 such that the extension register form the most significant bits of a concatenated register reference. Instruction decode unit 238 uses the concatenated register reference to index extension register set 272 according to the contents of the concatenated register reference. Microprocessor instruction 250, as shown in FIG. 7b include a first standard register reference field 284 and a second standard register reference field 252 when the contents of the second standard register field do not equal the extension register key value. The register reference fields shown in FIG. 7b consist of three bits, which is compatible with a maximum of eight standard registers.

Returning now to FIG. 6, instruction decode unit 238 is adapted to receive microprocessor instruction 250 and EXT 258. The microprocessor instruction includes operating mode information 252 indicative of whether instruction decode unit 238 is operating in a standard register mode or an extension register mode. Microprocessor instruction 252 further includes first and second register references indicative of first and second selected registers respectively. The instruction decode unit 238 is configured to access the contents of the first and second selected registers in response to receiving microprocessor instruction 250. The instruction decode unit 238 accesses the contents of the first and second selected registers from the standard register set 270 when EXT 258 is in a first state or when instruction decode unit 238 is operating in a standard register mode. Instruction decode unit 238 accesses the contents of first and second selected registers from extension registers set 272 when instruction decode unit 238 is operating in the extension register mode and the extension registers signal is in a second state.

In one embodiment, EXT 258 can be programmed by setting an appropriate bit within either the page table entry, page directory entry, or segment descriptor for the appropriate application program. FIG. 8 shows a diagram of a page directory/page table entry format. One embodiment of the present invention contemplates that the instruction decode unit reads bit 8 of the current page directory/page table entry to determine if the instruction decode unit is operating in an extension register mode. If bit 8 is set, then the instruction decode unit utilizes the extension register set when the extension register key value is found within the extension register key word of the microprocessor instruction. Similarly with respect to FIG. 9, one embodiment of the present invention contemplates that the instruction decode unit interprets bit 5 of byte 6 of the segment descriptor to determine if the currently executing segment is an extension register segment. If so, then the instruction decode unit utilizes the extension register set if the extension register key field of the microprocessor instruction contains the extension register key value as described previously. In another embodiment, a bit in the EFLAGS register may be used to program EXT 258. The EFLAGS register is an architected register in the X86 architecture used to store flag information as well as various status bits.

Figure 10:
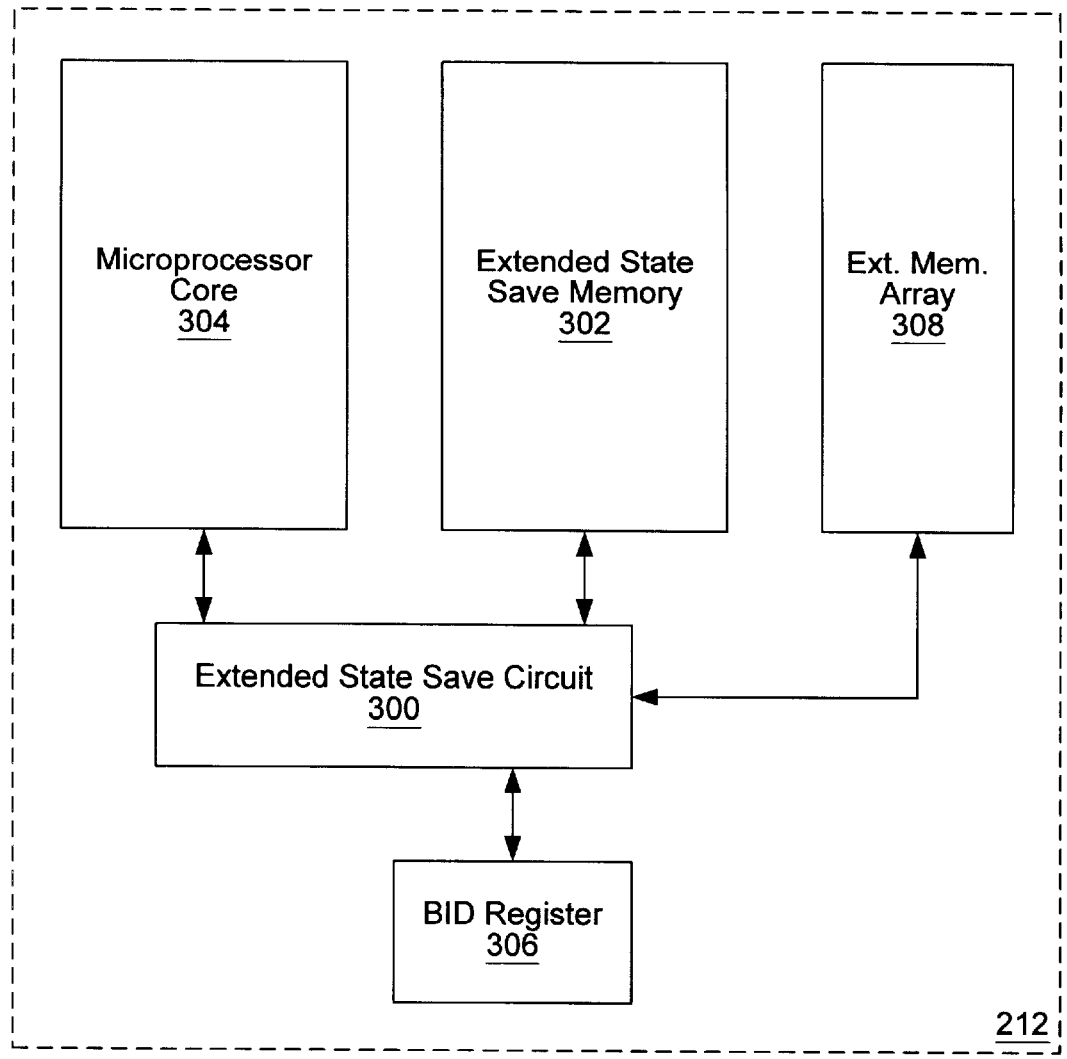
FIG. 10 is a block diagram of the extended register microprocessor of FIG. 4 showing additional details of an extended state save circuit, a dedicated memory, a BID register, and a dedicated memory array.

As noted above, existing operating systems, without modification, are incapable of saving the state of microprocessor 212 upon suspension of an extended register process. Accordingly, unless the operating system is changed, it may be impossible to save the state of an extended process suspended to execute a standard process or another extended process. FIG. 10 is a block diagram of microprocessor 212 having a mechanism for saving the state of a suspended extended process transparently to the operating system. A microprocessor employing this mechanism can accommodate applications written to exploit the extended register set without substantial modification of existing operating systems. More particularly, FIG. 10 shows an extended state save circuit 300 coupled between extended state save memory 302 and microprocessor core 304, a buffer identification (BID) register 306, and an extended memory array 308. It is noted that one of ordinary skill in the art will recognize that microprocessor core 304 includes, for example, the decode stage 238 and register file 244 described with reference to FIGS. 5 and 6.

Extended state save memory 302 is configured as a plurality of state saving buffers, each one of which can store the state of a suspended extended process including the contents of the extended register set 272. Although the extended state save memory 302 is shown to be included within microprocessor 212, it is readily apparent to one of ordinary skill in the art that the extended state save memory could be implemented off chip. In this case, a list of pointers which point to saved extended process states in the off chip memory, must be maintained. Using off chip memory to save extended processor states would reduce the overall size of microprocessor 212.

Extended memory array 308 contains a plurality of entries each one of which corresponds to a buffer within extended state save memory 302. Each extended memory array entry contains information as to whether its corresponding buffer has been allocated to an active or suspended extended process.

Extended state save circuit 300 may consist of a combination of hardware and software for transferring or saving the state of suspended extended processes in buffers of extended state save memory 302. As will be more filly described below, the extended state save circuit 300 operates transparently to the operating system so that an application written to take advantage of the extended register set may be executed without change to the existing operating system. In general, the extended state save circuit 300 allocates a buffer to an extended register process upon initial switch of the microprocessor 212 to the extended register operational mode described above. The allocation of buffers is done as an automatic operation when microprocessor 212 receives an instruction to transfer control to the extended register mode of operation. These control transfer instructions, including instructions for switching the microprocessor 212 from an extended register mode to a standard register mode, are more fully described below in connection with FIGS. 14–19. Because there are a limited number of buffers within extended state save memory 302, a switch to extended mode of operation is dependent upon availability of an unallocated buffer in memory 302. To this end, extended state save circuit 300 accesses extended memory array 308 and searches its entries to determine whether a buffer is available for allocation. If no buffer is available (i.e., all buffers have been allocated to extended register processes) the control transfer instruction will not be executed and the microprocessor 212 will remain in standard register operational mode. In this event, appropriate action can be taken including informing the user that insufficient resources are available, or running a slower standard register version of the extended register application. The buffer remains allocated to the extended register process across temporary transitions back to standard register mode of operation which may arise for exceptions, interrupts or calls for standard register functions. Moreover, the buffer remains allocated to a particular extended register process until the extended register process explicitly terminates its use.

BID register 306 is coupled to extended state save circuit 300 and is configured to store a BID identifying a buffer within extended state save memory 302. The BID thus links a particular extended register process with a buffer in extended state save memory 302. When an extended register process is initiated, the extended state save circuit 300 sets BID register 306 with the BID of the buffer allocated to the extended process. Upon suspension of the extended register process, the extended state save circuit 300 saves the state of the suspended process in the buffer specified by the BID within BID register 306. Further, when the extended register process is suspended to begin executing a standard register process, extended state save circuit 300 saves the active BID within BID register 306 as a part of the standard processes context, thereby allowing the link to be preserved when the extended register process is re-executed as will be more fully described below.

Figure 11:
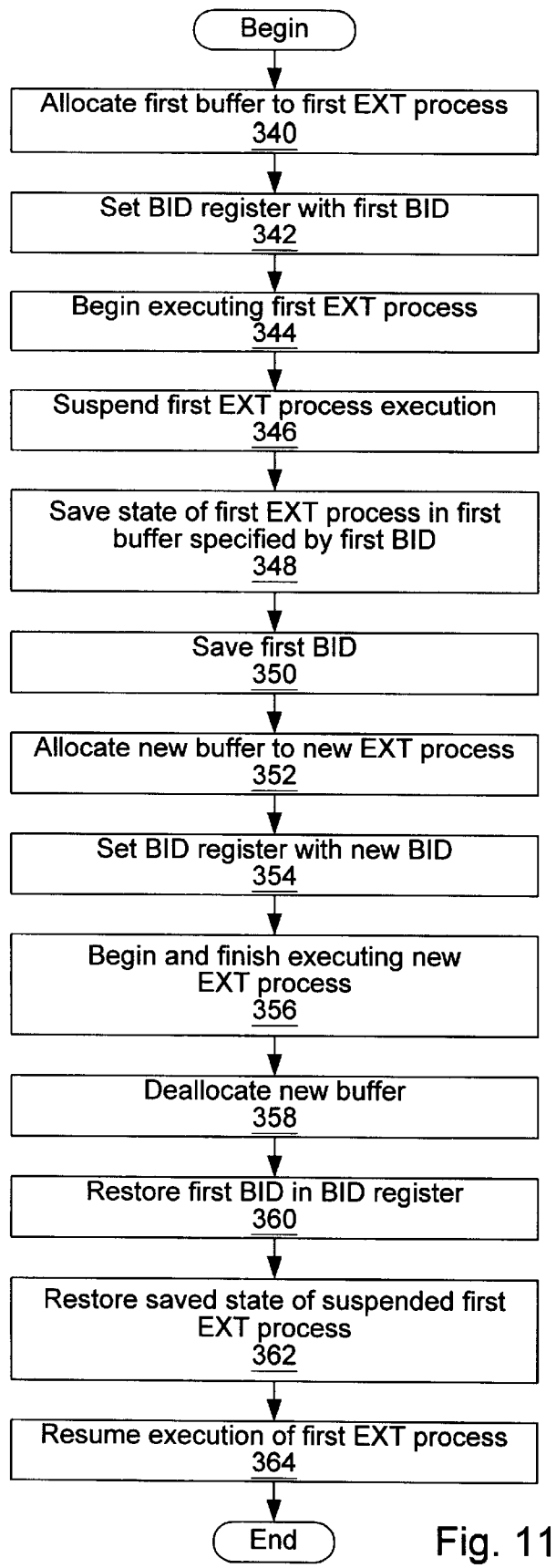
FIG. 11 is a flow chart showing operational aspects of a method of saving an extended register process state in accordance with the present invention.
Figure 12:
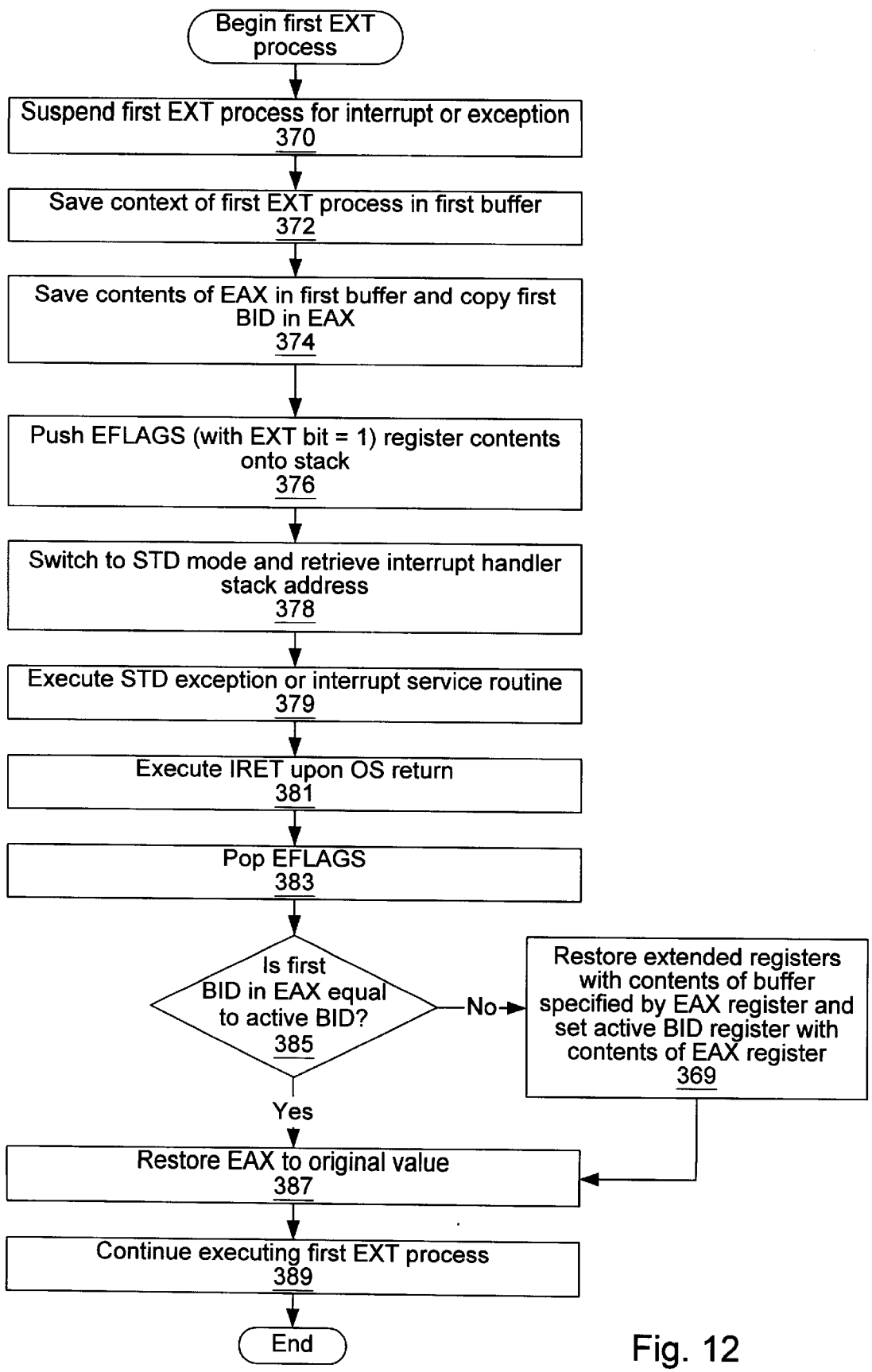
FIG. 12 is a flow chart showing operational aspects of a method of saving an extended register process state in response to a interrupt or exception in accordance with the present invention.
Figure 13:
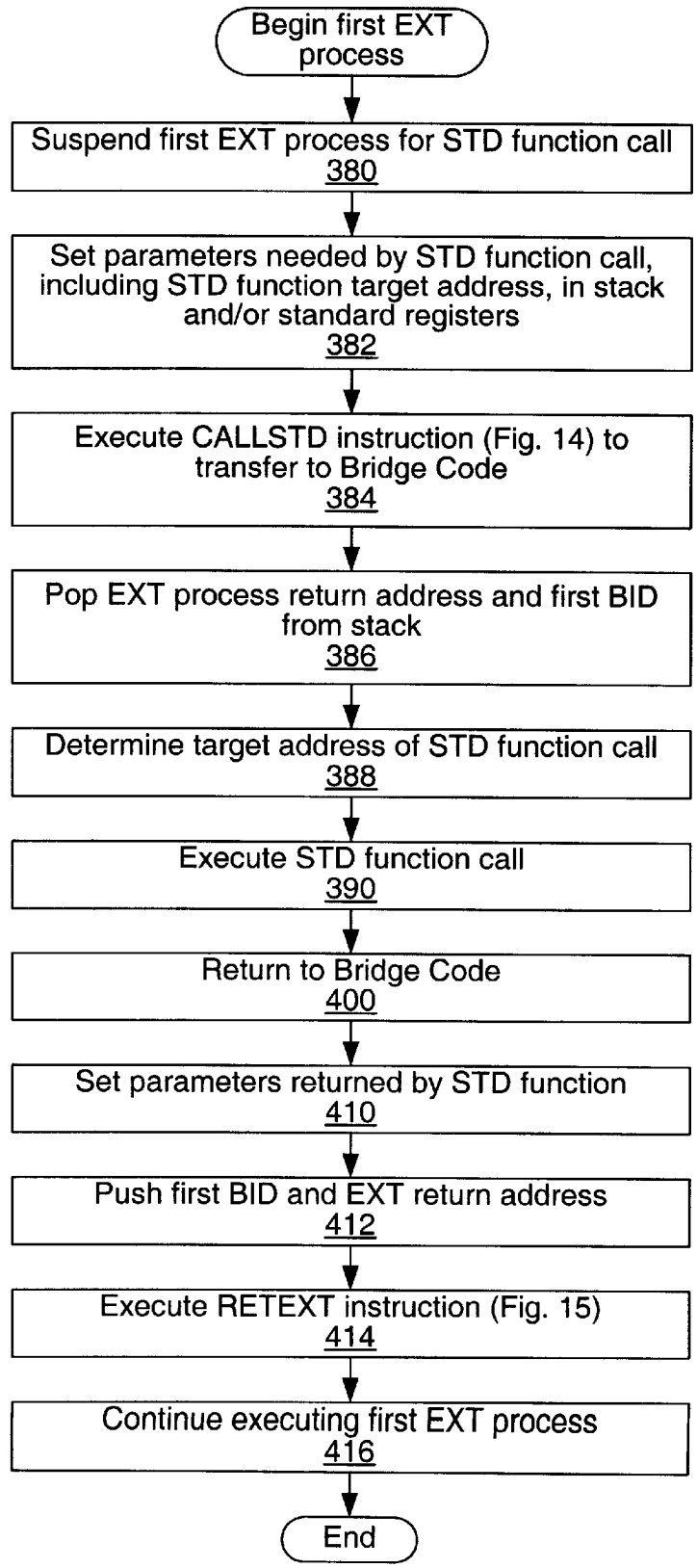
FIG. 13 is a flow chart showing operational aspects of a method of suspending an extended register process for a standard register function call in accordance with the present invention.

FIGS. 11—13 are flowcharts illustrating operation of the microprocessor 212 shown in FIG. 10 in accordance with the present invention. In FIG. 11, microprocessor 212 is in standard mode while executing a standard process when microprocessor 212 receives an instruction to switch to extended register mode in order to initiate a first extended register process. In response, extended state save circuit 300 allocates a first buffer to the first extended process and sets BID register with the BID identifying the first buffer as shown in steps 340 and 342. Thereafter, microprocessor 212 begins executing the first extended process as shown in step 344. During execution, microprocessor 212 may receive an instruction to suspend execution of the first extended process and begin execution of a second extended process. In step 346, microprocessor 212 does receive such an instruction and suspends execution of the first extended process. Extended state save circuit 300 saves the state of the first extended process in the first buffer specified by the first BID stored in BID register 306 as shown in step 348. Furthermore, extended state save circuit 300 preserves the first BID so that the first extended process can be restarted in the future. After the first extended process state is saved, extended state save circuit 300 allocates a new buffer to the new extended process as shown in step 352. As before, extended state save circuit sets BID register 306 with a new BID identifying the new buffer which will store the state of the new extended process if the new extended process is subsequently suspended. In this example, the new extended process is not suspended, and in step 356, the microprocessor core 304 begins and finishes executing the new extended process. Upon termination of the new extended process, the new buffer is deallocated by extended state save circuit in step 358. In step 360, extended state save circuit 300 restores the saved first BID in BID register 306. In step 362 extended state save circuit resets microprocessor 212 with the contents of the first buffer identified by the first BID. With the microprocessor thus reset, microprocessor 212 is now in the state it was when the first extended process was suspended. In step 364, the first extended process can be resumed.

FIG. 11 illustrates general operation of the extended state save circuit 300 when one extended register process is suspended so that microprocessor 212 can begin executing a new extended register process. FIGS. 12 and 13 are flowcharts illustrating operational aspects of the extended state save circuit 300 when an extended register process is suspended to begin executing a standard register process. With reference to FIG. 12, microprocessor 212, when executing a first extended register process, receives or generates an interrupt or exception at step 370. In response, extended state save circuit 300 at step 372 saves the microprocessor state including the contents of the extended register file, in a first buffer specified by a first BID in BID register 306 as shown in step 372. In FIG. 12, it is presumed that the extended state save circuit 300 has initially allocated the first buffer to the first extended process and set BID register 306 accordingly. Because the first extended process is suspended in favor of a standard register process, extended state save circuit 300 saves the contents of one of the standard registers (e.g., EAX) in the first buffer and copies the first BID in the EAX register thereby preserving the return link to the first extended register process as shown in step 374. The EFLAGS register with extended mode bit set to the first state thereby indicating microprocessor 212 is operating in the extended register mode, is pushed onto the stack in step 376. The operation mode is switched to standard register mode and an interrupt handler stack address is retrieved at step 378. Thereafter, the standard register exception or interrupt service routine is executed by microprocessor 212 to completion at step 379. Microprocessor 212 then executes an instruction return upon operating system return and pops the EFLAGS register contents, previously stored in the stack, at steps 381 and 383. At step 385, extended state save circuit 300 compares the first BID stored in standard EAX register with the contents of the BID register 306. Presuming that a second extended register process did not execute during the interrupt or exception routine, microprocessor 212 resumes execution of the first extended process after resetting the standard EAX register to its pre suspension value (retrieved from the first buffer), since the contents of the extended register file have not changed. See steps 387 and 389. However, if the extended state save circuit 300 determines that the first BID stored in EAX does not equal the active BID in BID register 306, microprocessor 212 in general, and the extended register file in particular, must be reset to the state it was when the first extended process was suspended by the interrupt or exception. In this event, as shown in step 369, the extended registers are reset with the contents of the first buffer specified by the first BID stored in the EAX register. Thereafter, BID register 306 is set with the contents of the EAX register and the first extended process to be resumed in step 389 after the EAX register is reset to its pre suspension value in step 387.

FIG. 12 outlines operation of the extended state save circuit 300 when a first extended register process is suspended to begin a standard register process upon an interruption or exception. FIG. 13 illustrates the general operation of extended state save circuit 300 when a first extended register process is suspended so that microprocessor 212 can begin executing a planned standard register function call. In step 380, microprocessor 212, while executing a first extended register process, receives an extended register instruction calling a standard register library routine. It is noted that it is desirable to allow extended register applications to employ standard register libraries and operating system services. For such calls, the standard register file typically does contain meaningful information which may be passed to the standard register process function call. Moreover, the results of executing the standard register process call may be needed by the original first extended mode process. Accordingly, it becomes imperative that parameters are passed back and forth between extended and standard register processes. To facilitate this, in step 382, the extended state save circuit 300 operating in connection with the microprocessor core 304, sets parameters needed for the standard register function call, including a standard register function target address, in the stack and/or the standard register file.

Figure 14:
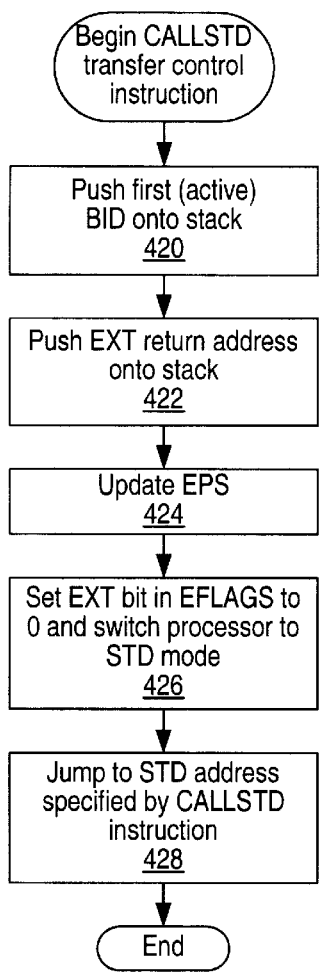
FIG. 14 is a flow chart showing operational aspects of the present invention when switching the microprocessor between extended and standard register modes.

The standard register function calls are not configured to reactivate the microprocessor 212 into extended register mode upon call completion. In other words, a standard register return instruction is not configured to return microprocessor to extended register mode operation. As a result, a special bridge code is needed to preserve the first BID, transition the microprocessor 212 between the extended and standard modes, and for exchanging needed parameters between the extended and standard processes. Moreover, to maintain operating system transparency to the extended register process state save, additional instructions need to be added to both the standard and extended instruction set. One such instruction to be added to the extended register instruction set is CALLSTD more fully described in connection with FIG. 14. In step 384 of FIG. 13, CALLSTD is executed in order to transfer to the bridge code which is needed between the suspended first extended register process and the planned standard register function call. Turning to FIG. 14, when the microprocessor 212 receives the CALLSTD transfer control instruction, the extended state save circuit 300 pushes the first BID and the extended process return address onto the stack as shown in steps 420 and 422. It is noted that the extended return address is known to one of skill in the art to be the next extended register instruction to be executed when the first extended process is resumed. After the stack pointer is updated in step 424, the microprocessor 212 is switched to standard register mode and a jump is made to the address specified by the CALLSTD instruction, which in this example, is the target address of the bridge code. The addresses specified by the CALLSTD instruction is contained in the operand, which can be retrieved by using different addressing modes. It is noted, that when calling the standard register process, the first extended process is merely suspended. As a result, the first buffer is not deallocated. It is further noted that steps 420 and 422 could create a page fault, which would translate into an exception with the EXT bit equal to 1 in EFLAGS register. In this case, ESP must not be updated.

With continuing reference to FIG. 13, the bridge code is described with reference to steps 386 through 414. In particular, in step 386, the extended register process return address and first BID is popped from the stack. Thereafter, in step 388 the target address of the standard register function call is determined. The bridge code then temporarily suspends so that the planned function call can be executed in step 390. After the standard register function call is executed, a return is made to the bridge code in step 400, and at step 410, the parameters returned by the standard register function call and needed by the first extension process, are set in the standard register file or the stack. In step 412, the first BID and the first extended process return address are pushed on the stack. Thereafter, microprocessor 212 executes a RETEXT control instruction to switch microprocessor 212 back to extended register mode and set the microprocessor core 304, including the extended register file if needed, to the state it was when the first extended register process was suspended in step 380. Thus set, microprocessor 211 can continue executing the first extended process as shown in step 416.

Figure 15:
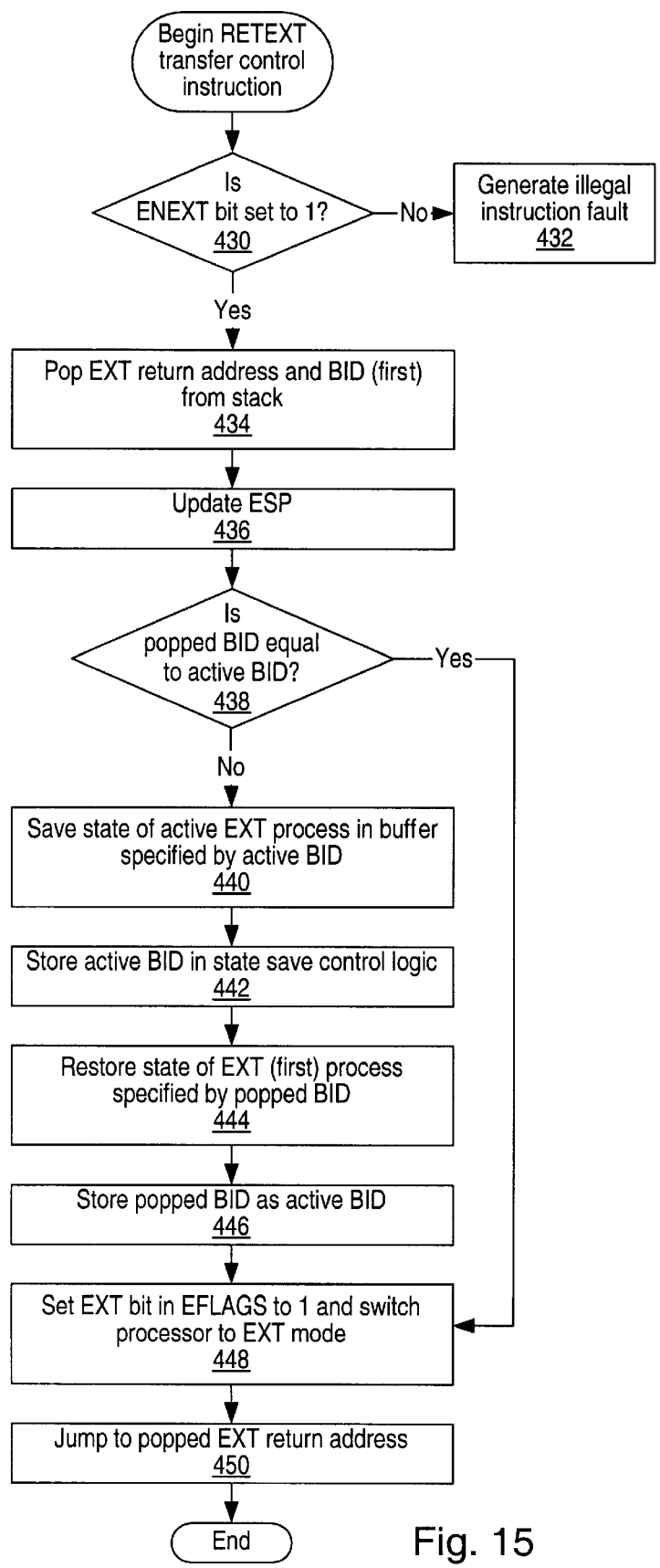
FIG. 15 is a flow chart showing operational aspects of the present invention when switching the microprocessor between extended and standard register modes.

RETEXT control instruction, introduced above, is a standard register instruction which should be added to the standard register instruction set. This instruction is needed for operating system transparent, extended state save, and to complete the return to and re-execution of the first process in FIG. 13. With reference to FIG. 15, the RETEXT instruction is more fully described. At step 430, after microprocessor receives the RETEXT instruction in the standard mode of operation, the ENEXT bit is accessed to determine whether it is set to one. If it is not, then an illegal instruction fault is generated at step 432 notifying the user that microprocessor 212 cannot enter the extended register mode of operation. However, if the ENEXT bit is set, operation proceeds to step 434 wherein the EXT return address and first BID are popped from the stack. This is followed by an update of the ESP step 436. At step 438, assuming the ENEXT bit is set to 1, the extended state save circuit 300 compares the popped first BID with the BID register 306 contents (also referred to as the active BID). If the two values are not equal, microprocessor core 304 is not in the state it was when the first extended register process was suspended. Accordingly, a state switch must occur to properly set microprocessor core 304. In this regard, the contents of the active extended register process corresponding to the active BID of the BID register 306, including the contents of the extended register file, are saved by extended state save circuit 300 in the buffer specified by the active BID register 306 as shown in step 440. Thereafter, in step 442, the active BID in BID register 306 is saved so that the corresponding extended process can be restarted at a future time. At step 444, extended state save circuit 300 resets microprocessor core 304 to the state it was at suspension of the first extended register process (see step 380 of FIG. 13). This state is stored in the buffer identified by the popped first BID. BID register 306 is set with the popped first BID in step 446 and the microprocessor is switched to the extended register mode in step 448. In step 450 microprocessor core 304 begins re-execution of the suspended first process upon jumping to the extended return address popped from the stack as shown in step 450. However, in step 438, if the extended state save circuit 300 determines that the popped BID equals the active BID in BID register 306, then the microprocessor core 304 is in a proper state to resume execution of the first extended process. Accordingly, control is transferred to step 448 wherein microprocessor 212 is switched to the extended mode of operation followed by a re-execution of the first extended process.

Figure 16:
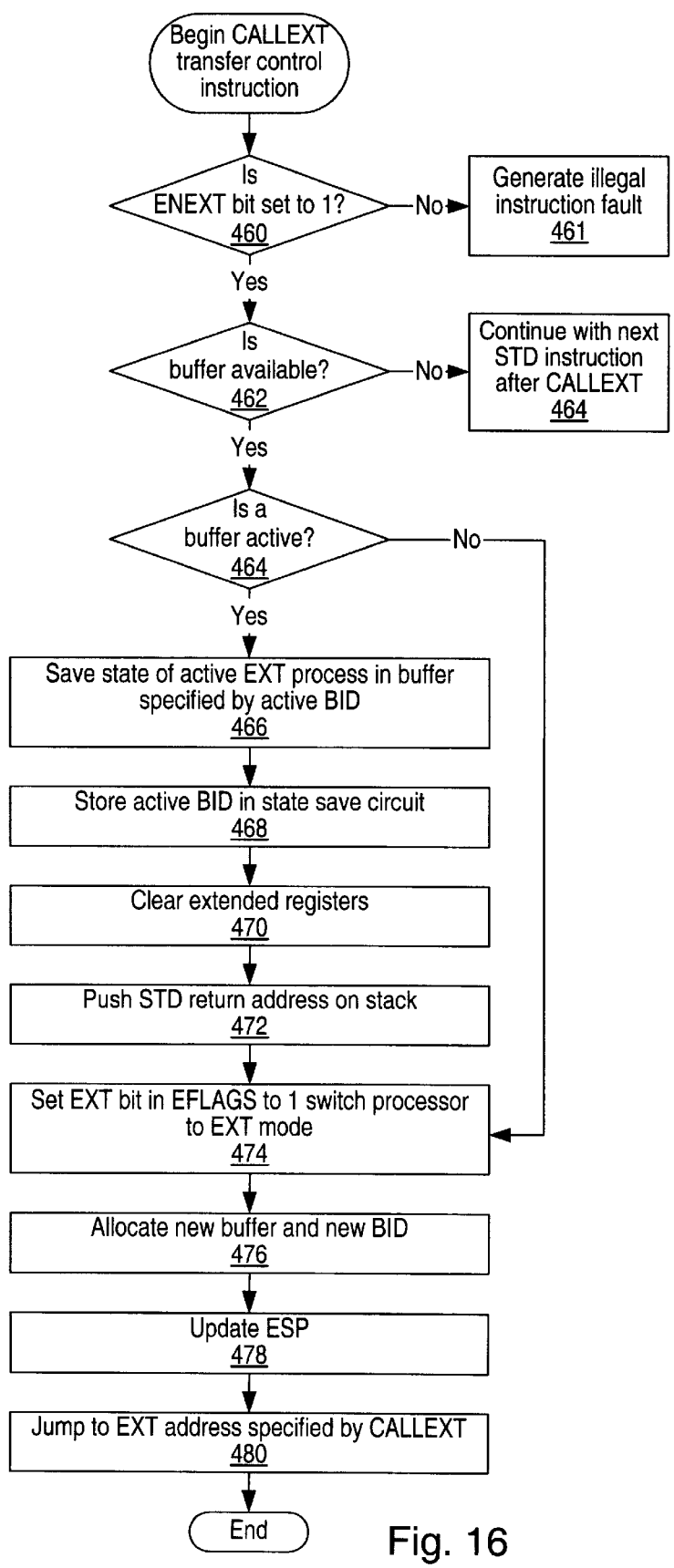
FIG. 16 is a flow chart showing operational aspects of the present invention when switching the microprocessor between extended and standard register modes.

As noted above certain instructions need to be added to both the extended and standard register instruction sets in order to maintain operating system transparent extended state save. CALLSTD and RETEXT, described in connection with FIGS. 14 and 15, respectively, are two such added instructions. FIGS. 16–19 describe four other instructions to be added to the extended and standard register instruction set in order to maintain operating system transparency. FIG. 16 is a flowchart illustrating operational aspects of the CALLEXT transfer control instruction. This instruction is employed to call an extended register process when microprocessor 212 is executing a standard process. Upon microprocessor receipt of the CALLEXT instruction, extended state save circuit 300 checks the ENEXT bit to determine whether it is set to one in step 460. If the ENEXT bit is not set to one, an illegal instruction fault is generated in step 461 and the standard process terminates. If the ENEXT bit is set to one, the extended state save circuit, in step 462, accesses extended memory array 308 to determine whether a buffer is available for allocation to the extended process to be executed. If no buffer is available, the standard process is continued with the next standard instruction in the sequence after the CALLEXT transfer control instruction, as shown in step 464. If a buffer is available, extended state save circuit determines whether a buffer is active as shown in step 464. If a buffer is active, then extended state save circuit 300 saves the state of microprocessor core 304 in the buffer specified by the active BID as shown in step 466. The active BID is also saved and the extended registers are cleared in steps 468 and 470. The standard return address is pushed on to stack at step 472 and the microprocessor is switched to extended register mode as shown in steps 472 and 474. Extended state save circuit 300 allocates a new buffer and new BID in step 476 to the extended process to be executed. The stack pointer is updated in step 478 and a jump is made to the extended address specified by the CALLEXT instruction wherein the extended process begins. The extended address is contained in the operand of the CALLEXT instruction, which can be retrieved by using different addressing modes. It is apparent to one of ordinary skill in the art that where the switch to extended mode of operation is successful, the extended process will eventually return to the instruction following the CALLEXT instruction. A ZF bit in EFLEAGS may be used to distinguish a fall though condition from a normal return. The ZF bit could be tested by a JZ instruction following the CALLEXT instruction. Thus, if the standard process calling the extended process continues as a result of buffer unavailability, as shown in step 464, ZF is set. In contrast, upon return to the standard process calling the extended process, the ZF bit is cleared.

Figure 17:
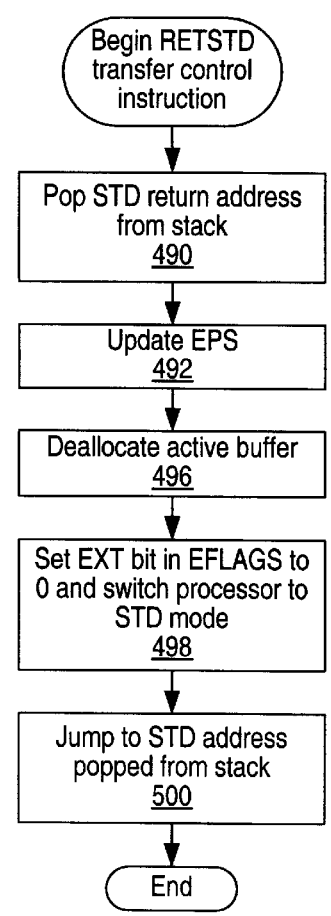
FIG. 17 is a flow chart showing operational aspects of the present invention when switching the microprocessor between extended and standard register modes.

FIG. 17 is a flowchart illustrating the operational aspects of a RESTD transfer control instruction. This instruction corresponds to the CALLEXT instruction and is added to the extended register instruction set. RESTD is used to return to a standard register process upon completion of a called extended register process. Upon receipt of the RETSTD instruction by the microprocessor, the standard return address (see FIG. 16, step 472) is popped from the stack as shown in step 490. After the stack pointer is updated in step 492, extended state save circuit 300 deallocates the active buffer associated with the called extended process in step 496. This is done since the called extended process completed thus negating the need for a future state save thereof. Thereafter, the microprocessor switches to standard register mode and microprocessor 212 begins executing the standard process indicated by the standard return address popped from the stack as shown in step 500. It is noted that in step 490 may cause a page fault, which would translate into an exception with the EXT bit equal to 1 in the EFLAGS register. In this event, ESP must not be updated.

Figure 18:
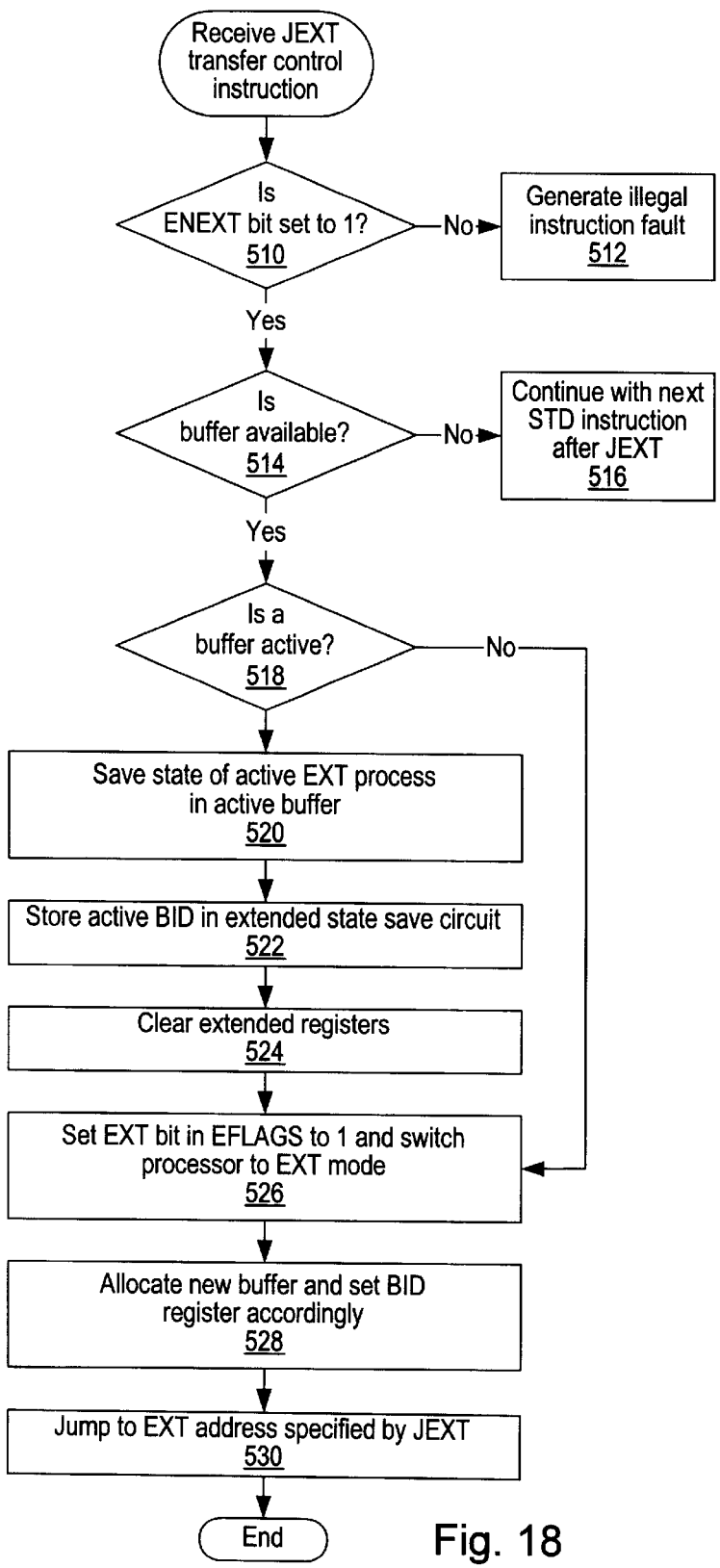
FIG. 18 is a flow chart showing operational aspects of the present invention when switching the microprocessor between extended and standard register modes.
Figure 19:
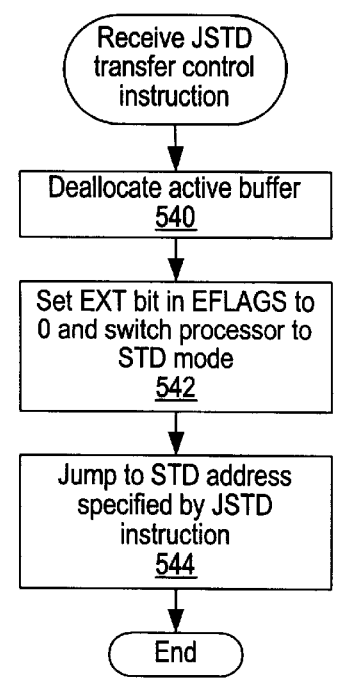
FIG. 19 is a flow chart showing operational aspects of the present invention when switching the microprocessor between extended and standard register modes.

FIGS. 14–17 illustrate operation of the microprocessor 212 according to the present invention when calling standard register processes when microprocessor 212 is executing an extended register process, and when calling an extended register process when microprocessor 212 is executing a standard register process. FIGS. 18 and 19 illustrate operation of microprocessor 212 when jumping to a standard register process during the execution of an extended register process, and when jumping to an extended register process when executing a standard register process. More particularly, FIG. 18 is a flowchart illustrating operation of microprocessor 212 when executing a JEXT instruction to jump to an extended register process. In step 510, the ENEXT bit is checked to determine whether it is set to one. If it is not set, microprocessor 212 informs the user by generating an illegal instruction fault as shown in step 512. If the ENEXT bit is set, microprocessor 212 then checks to determine at step 514 whether a buffer is available for allocation of the extended register processor to be executed. If a buffer is unavailable, then the jump is not executed and the standard register process continues sequentially after the JEXT instruction in standard register mode as shown in step 516. If, however, a buffer is available, microprocessor 212 determines whether a buffer is active in step 518. If a buffer is active, the state of microprocessor 212 including the contents of the extended register set, is saved in the active buffer as shown in step 520. Thereafter, in step 522 the active BID is stored within the extended state save circuit. In step 524 the extended registers are cleared, and in step 526 microprocessor 212 is switched to the extended register mode of operation. Thereafter, a new buffer and BID are allocated to the extended register process to be executed in step 528 in case the new extended process is suspended. Finally in step 530, microprocessor 212 begins executing the extended mode register process, the start address of which is identified by the JEXT operand. The address of the extended mode process can be retrieved by using different addressing modes. In one embodiment, flat addressing is employed, although a classic standard intersegment transfer could be defined as well.

FIG. 19 illustrates operation of microprocessor 212 when jumping to a standard register process. In particular, when microprocessor 212 receives a JSTD instruction to transfer control to a standard process identified by an operand contained within the JSTD instruction, microprocessor 212 deallocates the currently active buffer as shown in step 540. In step 542, the microprocessor switches to standard register mode of operation. Thereafter, the microprocessor begins executing the standard register process identified by the address contained within the JSTD instruction as set forth in 544.

As noted above instructions are added to the standard and extended register instruction set in order to maintain operating system transparent extended state save. As shown, extended states are saved to an allocated buffer at the point of extended process suspension. Later, the microprocessor is reset with the contents of the buffer and the extended process is resumed. However, this may add unnecessary overhead since the extended state really only needs to be saved if a different extended mode process is executed upon return. Many switches to standard register mode will be followed by switch back to the same extended mode process. Since the standard register mode process generally does not disturb the extended state, often times the extended state will remain intact upon return. As such, the present invention contemplates that extended register states save upon mode switch should be minimized.

It is possible that the operating system could terminate an extended mode process prematurely due to, for example, an unrecoverable page fault In these instances, a buffer is left allocated and unavailable for use. If the operating system allows an application to specify a cleanup procedure to be run in the event of premature termination, the procedure could release the allocated buffer. The corresponding BID could be communicated to the cleanup procedure when the process first enters extended register mode. The procedure could use the corresponding BID and implement a RETEXT to a RETSTD instruction. In the alternative, a watchdog process could be started prior to any extended mode process. When an extended process starts, a user identifiable application name and BID are provided to the watchdog process. Upon termination, the user could query the watchdog process to initiate cleanup actions.

As noted above microprocessor 212 often checks to determine whether a buffer is available upon instruction to begin executing an extended register mode process. When no buffer is available, microprocessor 212 continues in the standard register execution mode and executes a standard register process with identical functionality but at lower performance. Accordingly, the amount of extended state memory 302 is not a limit. Rather, it defines the limit where an additional process cannot be executed with higher performance.

While the present invention has been described with reference to particular embodiments, it will be understood that the embodiments are illustrative and that the invention scope is not so limited. Many variations, modifications, additions and improvements to the embodiment described are possible. These variations, modifications, additions and improvements may fall within the scope of the invention as defined in the following claims.

What is claimed is:

1. A microprocessor, comprising:
a microprocessor core, including:
a standard register file; and
an extended register file;
wherein said microprocessor core is configured to execute standard instructions that use said standard register file, but not said extended register file;
wherein said microprocessor core is further configured to execute extended instructions that use said extended register file; and
wherein said microprocessor core is further configured to receive interrupts or exceptions; and
an extended state save circuit coupled to said microprocessor core, wherein said extended state save circuit is configured to restore, in response to a return from an interrupt or exception, a state of the extended register file for a process using said extended instructions if said interrupt or exception was received during execution of said process.

2. The microprocessor as recited in claim 1, wherein said extended state save circuit is further configured to restore said state from a saved version of said state if another process using said extended instructions was executed after said interrupt or exception and before said return.

3. The microprocessor as recited in claim 2, wherein said extended state save circuit is further configured to restore said state as the current state of said extended register file if no other process using said extended instructions was executed after said interrupt or exception and before said return.

4. The microprocessor as recited in claim 1, wherein said extended state save circuit is further configured to save a state of said extended register file to a different memory buffer for each of a plurality of processes using said extended instructions.

5. The microprocessor as recited in claim 4, further comprising a memory buffer identification register coupled to said extended state save circuit and configured to store an identifier for identifying the memory buffer allocated for storing the state of said extended register file for a current one of said plurality of processes.

6. The microprocessor as recited in claim 5, wherein said extended state save circuit is configured to save said identifier from said memory buffer identification register for the current one of said plurality of processes in response to the interrupt or exception being received during execution of the current process.

7. The microprocessor as recited in claim 6, wherein said extended state save circuit is configured to compare the contents of said buffer identification register to the saved identifier for the process being executed when the interrupt or exception was received and restore the state of the extended register file from the memory buffer identified by the saved identifier if the saved identifier differs from the contents of said buffer identification register upon return from said interrupt or exception.

8. The microprocessor as recited in claim 6, wherein said extended state save circuit is configured to save the contents of a standard register from said standard register file to the memory buffer identified by said identifier from said memory buffer identification register, and wherein said extended state save circuit is further configured to save said identifier from said memory buffer identification register to said standard register, in response to the interrupt or exception being received during execution of the current process using said extended instructions.

9. The microprocessor as recited in claim 4, further comprising a plurality of memory buffers, wherein each one of said plurality of memory buffers is configured to be one of the different memory buffers for each of the plurality of processes using said extended instructions.

10. The microprocessor as recited in claim 9, further comprising an extended memory array for indicating which ones of said plurality of memory buffers are allocated to one of the plurality of processes using said extended instructions.

11. The microprocessor as recited in claim 1, wherein said extended state save circuit is configured to store an extended mode indication if said interrupt or exception is received during execution of said process using said extended instructions.

12. The microprocessor as recited in claim 11, wherein said microprocessor is an X86 compatible microprocessor, and wherein said extended mode indication is a bit in the EFLAGS register, wherein said extended state save circuit is configured to store said extended mode indication by storing the contents of the EFLAGS register onto a memory stack in response to said interrupt or exception.

13. The microprocessor as recited in claim 1, wherein said extended instructions are configured to use registers corresponding to said extended register file or said standard register file.

14. The microprocessor as recited in claim 1, wherein said microprocessor core is configured to execute an instruction for jumping to or calling a process using said extended instructions, wherein in response to said instruction for jumping to or calling a process using said extended instructions, said extended state save circuit is configured to allocate a memory buffer for storing the state of said extended register file for the process being jumped to or called.

15. The microprocessor as recited in claim 14, wherein if no memory buffer is available to be allocated in response to said instruction for jumping or calling a process using said extended instruction, said microprocessor core is configured to jump to or call an alternate process not using said extended instructions.

16. The microprocessor as recited in claim 1, wherein said microprocessor core is configured to execute an instruction for returning to a process using said extended instructions, wherein in response to said instruction for returning to a process using said extended instructions, said extended state save circuit is configured to restore the state of said extended register file for the process being returned to.

17. The microprocessor as recited in claim 1, wherein said microprocessor core is configured to execute an instruction for jumping to or returning to a second process not using said extended instructions from a first process using said extended instructions, wherein in response to said instruction for jumping to or returning to the second process, said extended state save circuit is configured to deallocate a memory buffer previously allocated for storing the state of said extended register file for the first process.

18. The microprocessor as recited in claim 1, wherein said microprocessor core is configured to execute an instruction for calling a second process not using said extended instructions from a first process using said extended instructions, wherein in response to said instruction for calling a second process, said extended state save circuit is configured to save an identifier to a memory buffer allocated for storing the state of said extended register file for the first process.

19. A method for restoring the state of a process, comprising:
executing a standard process in a standard register mode in a microprocessor, wherein in the standard register mode the standard process uses standard registers in a standard register file but not extended registers in an extended register file;
executing an extended process in an extended register mode in the microprocessor, wherein in the extended register mode the extended process uses the extended registers in the extended register file;
receiving an interrupt or exception during the extended register mode;
saving an identifier for the extended process executing when the interrupt or exception is received;
processing the interrupt or exception;
returning from said processing the interrupt or exception; and
in response to said returning, restoring the state of the extended register file according to said identifier.

20. The method as recited in claim 19, wherein said restoring comprises:
comparing said identifier to a current identifier for a current extended process;
if said identifier is different than said current identifier, restoring the state of the extended register file from a memory location indicated by said identifier; and
if said identifier matches said current identifier, using the current state of the extended register file.

21. The method as recited in claim 19, further comprising storing the state of the extended register file to a memory location indicated by said identifier.

22. The method as recited in claim 19, wherein said saving an identifier comprises saving the contents of one of the standard registers to a memory location indicated by said identifier and copying said identifier to the standard register whose contents are saved to the memory location.

23. The method as recited in claim 22,
wherein said restoring comprises:
comparing the contents of the standard register to which said identifier is saved to a current identifier for a current extended process;
if said identifier is different than said current identifier, restore the state of the extended register file from a memory location indicated by said identifier; and
if said identifier matches said current identifier, using the current state of the extended register file; and
wherein the method further comprises restoring the contents of the standard register from the memory location indicated by said identifier.

24. The method as recited in claim 19, wherein said processing the interrupt or exception comprises:
saving an indication that the microprocessor was in the extended register mode when the interrupt or exception was received;
switching to the standard register mode; and
executing an interrupt or exception service routine in the standard register mode.

25. The method as recited in claim 19, further comprising jumping to or calling the extended process from the standard process.

26. The method as recited in claim 25, wherein said jumping to or calling the extended process comprises allocating a memory buffer for storing the extended register state for the extended process.

27. The method as recited in claim 26, wherein said jumping to or calling the extended process further comprises storing the identifier for the extended process in a buffer ID register, wherein the identifier points to the memory buffer.

28. The method as recited in claim 27, wherein said jumping to or calling the extended process further comprises, if an identifier for another extended process is in said buffer ID register, saving the state of the extended register file and the identifier for the other extended process in a memory buffer for the other extended process before beginning execution of the extended process being jumped to or called.

29. The method as recited in claim 26, wherein said jumping to or calling the extended process further comprises, if no memory buffers are available for said allocating, jumping or calling a substitute standard process for the extended process.

30. The method as recited in claim 19, further comprising returning to the extended process from the standard process.

31. The method as recited in claim 30, wherein said returning to the extended process comprises restoring the state of the extended register file according to said identifier.

32. The method as recited in claim 30, wherein said returning to the extended process comprises:

comparing the identifier for the extended process to the current identifier for the current extended process;

if said identifier for the extended process being returned to is different than said current identifier, restoring the state of the extended register file from a memory location indicated by said identifier for the extended process being returned to; and if said identifier for the extended process being returned to matches said current identifier, using the current state of the extended register file for the extended process being returned to.

33. The method as recited in claim 19, further comprising jumping or returning to the standard process from the extended process.

34. The method as recited in claim 33, wherein said jumping or returning to the standard process comprises deallocating a memory buffer previously allocated for storing the state of the extended register file for the extended process.

35. The method as recited in claim 19, further comprising calling the standard process from the extended process.

36. The method as recited in claim 35, wherein said calling the standard process comprises saving the identifier for the extended process.

37. The method as recited in claim 36, wherein the identifier for the extended process indicates a memory location for storing the state of the extended register file for the extended process.

38. The method as recited in claim 35, wherein said calling the standard process comprises switching to the standard register mode.

* * * * *